(12) United States Patent
Gavish et al.

(10) Patent No.: US 11,606,395 B2
(45) Date of Patent: Mar. 14, 2023

(54) SYSTEMS AND METHODS FOR VERIFYING AND ENFORCING CYBERSECURITY CONTROL POLICIES ACROSS SAAS PLATFORMS

(71) Applicant: DOCONTROL, INC., New York, NY (US)

(72) Inventors: Adam Gavish, New York, NY (US); Omri Weinberg, New York, NY (US); Liel Ran, Kiryat Ono (IL)

(73) Assignee: DOCONTROL, INC., New York, NY (US)

( * ) Notice: Subject to any disclaimer, the term of this patent is extended or adjusted under 35 U.S.C. 154(b) by 0 days.

(21) Appl. No.: 17/551,676

(22) Filed: Dec. 15, 2021

(65) Prior Publication Data

US 2022/0191251 A1 Jun. 16, 2022

Related U.S. Application Data

(60) Provisional application No. 63/160,288, filed on Mar. 12, 2021, provisional application No. 63/125,433, filed on Dec. 15, 2020.

(51) Int. Cl.
*H04L 9/40* (2022.01)

(52) U.S. Cl.
CPC ............ *H04L 63/20* (2013.01); *H04L 63/101* (2013.01); *H04L 63/105* (2013.01); *H04L 63/108* (2013.01)

(58) Field of Classification Search
CPC ..... H04L 63/20; H04L 63/101; H04L 63/105; H04L 63/108; H04L 63/10
USPC .............................................................. 726/1
See application file for complete search history.

(56) References Cited

U.S. PATENT DOCUMENTS

| 11,366,723 | B2 * | 6/2022 | Bansod ............... G06F 11/1451 |
| 2018/0232259 | A1 * | 8/2018 | Chowdhury .......... G06F 9/4881 |
| 2020/0394110 | A1 * | 12/2020 | Ramohalli Gopala Rao ............... G06F 16/285 |

* cited by examiner

*Primary Examiner* — Teshome Hailu
*Assistant Examiner* — Aubrey H Wyszynski
(74) *Attorney, Agent, or Firm* — Bryan Cave Leighton Paisner LLP

(57) ABSTRACT

The present disclosure relates to techniques for enforcing control policies on one more software as a service (SaaS) platforms from a centralized security control platform. An integration component is configured to integrate SaaS accounts with the security enforcement platform. The security enforcement platform executes functions that facilitate the creation of control policies on SaaS accounts. Exemplary control polices can be created to manage or control file sharing activities, user authentication, plugin usage, and/or other functions and features that may impact the security of the files or content included on the SaaS accounts. Activity events generated by the integrated SaaS accounts can be monitored by the security control platform. The activity events monitored by the security enforcement platform can be utilized to enforce the control policies and facilitate verification of file sharing activities.

18 Claims, 14 Drawing Sheets

Policies

Select policy type

| 331 Temporary sharing — Automatically expire sharing links after a period of time | 332 Sharing deny list — Define which users can never share to which external users | 333 Public assets — Automatically detect response and prevent public sharing incidents | 334 Cleanup inactive permissions — Automatically removing sharing permissions remained inactive for a period of time |
|---|---|---|---|
| 335 MFA disable warning — When users consume SaaS while having no MFA configured | 336 Data retention — Automatically delete data in certain folders after a period of time | 337 Sharing approval model — Define an approval model for external sharing to prevent human error | 338 Plugin deny list — Prevent users from installing SaaS plugins with excess permissions |
| 339 Time restrictions — Prevent external users from accessing data in certain time of day/dates | 340 Access lockdown — Temporarily remove access to specific data sources based on SOAR signals | 341 Access Consent Request — Automatically obtain data access consent from external users | 342 Custom — Apply your own policy |

← Edit Temporary sharing  Automatically expire sharing links after a period of time Configuration  Activity  310  320

1. Define workflow conditions

*Policy name
[User is sharing]

*Internal users  ⊙ All users
[Select groups]
[user@email.com x]

*External users/domains  ⊙ All external users/domains
[Select groups]
[NewUser@email.com x]

*Affected apps  ⊙ All apps
[Cloud Drive]

2. Define workflow actions

| 01 | ⏱ Wait | 1 | Week | > |
| 02 | ◁ Notify | ✉ Email Custom ⌄ | user@email.com | > |
| 03 | ✦ Enforce | Remove sharing | | |

(+) Add action step

← Edit Turn public assets into private  Automatically detect, response, and prevent public sharing incidents Configuration  Activity  310                                             320

1. Define workflow conditions

*Policy name

[Remove public sharing]

*Internal users                                     ⊙ All users

[All]

[All]

*Affected apps                                      ⊙ All apps

[App1 x] [App2 x] [App3 x] [App4 x] [App5 x] [App6 x]

2. Define workflow actions

| 01 | ⚡ Enforce | Remove public sharing ⌄ |
| 02 | ▽ Notify  | ┙ Slack Slack-testing ⌄ |
| 03 | ▽ Notify  | ✉ Email Actor ⌄ |
| 04 | ▽ Notify  | ⊞ Teams backend-webhook ⌄ |

⊕ Add action step

FIG.3D

Events

Events insights [+]

Events count [+]

Date & Time after ⊗ | Actor contains "email" ⊗
11-01-20 | ▽ Add filter

| Date & Time | Actor | Targe App | Asset | Event type | Event id | |
|---|---|---|---|---|---|---|
| 11-18-20 07:35:25 | user1@email.com | Cloud Drive | Backed developer... | view | 3461ced... | Event JSON |
| 11-16-20 05:20:06 | user2@email.com | Cloud Drive | A Round VCs | download | 8ae47ca... | Event JSON |
| 11-16-20 05:19:46 | user2@email.com | Cloud Drive | A Round VCs | view | ffc52c45... | Event JSON |
| 11-15-20 10:35:44 | user2@email.com | Cloud Drive | A Round VCs | view | f76188bd... | Event JSON |
| 11-15-20 10:27:27 | user2@email.com | Cloud Drive | A Round VCs | view | c4c76c19... | Event JSON |
| 11-15-20 04:00:39 | user2@email.com | Cloud Drive | Backend developer... | view | a50bffd1... | Event JSON |
| 11-15-20 03:18:39 | user1@email.com | Cloud Drive | Backend developer... | view | b48e83c... | Event JSON |
| 11-14-20 07:01:44 | user1@email.com | Cloud Drive | Backend developer... | view | b97074c... | Event JSON |
| 11-14-20 07:01:42 | user1@email.com | Cloud Drive | Backend developer... | view | 4cb0ee8... | Event JSON |
| 11-09-20 17:24:43 | user1@email.com | Cloud Drive | Backend developer... | view | 7864aab... | Event JSON |

FIG.5

Policy:
Name: Box – External Sharing Approval by Employees
Created by: John Smith    Type: Share

Event:
Event date: Wed, 17 Feb 2021 20:06:41 GMT
Actor: Jane Doe    App: BOX
Asset type: file    Target: Mike Smith

Steps:
1. Step: approve
   Approve   Decline
2. Step: notifications
3. Step: notifications
4. Step: enforce

SYSTEMS AND METHODS FOR VERIFYING AND ENFORCING CYBERSECURITY CONTROL POLICIES ACROSS SAAS PLATFORMS

CROSS-REFERENCE TO RELATED APPLICATIONS

This application claims the benefit of U.S. Provisional Application No. 63/125,433 filed on Dec. 15, 2020 and U.S. Provisional Application No. 63/160,288 filed on Mar. 12, 2021. The contents of all the above-identified applications are incorporated by reference herein in their entireties.

TECHNICAL FIELD

This disclosure is related to improved network and cloud-based security techniques for enforcing control policies on one or more SaaS platforms. In certain embodiments, the cybersecurity techniques disclosed herein may utilize a centralized control platform to enforce file sharing control policies and/or other security enhancing control policies across multiple SaaS platforms. In certain embodiments, the cybersecurity techniques disclosed herein facilitate security verification of the file sharing control policies and/or other security enhancing control policies across multiple SaaS platforms.

BACKGROUND

Software as a service (SaaS) platforms are utilized by many organizations and/or individuals for a variety of purposes. The security features offered by SaaS platforms vary across platforms and tend to be implemented using different protocols. Due to the inconsistent nature of the security features provided across the various SaaS platforms, there is no uniform or centralized solution to monitor and enforce security across multiple SaaS platforms.

Using SaaS platforms can present various security risks. One potential security risk relates to sharing files through the SaaS platforms. Other potential security risks may arise when users fail to configure appropriate security features (e.g., multi-factor authentication) and/or install plugins with broad permissions to access files and/or content associated with their SaaS accounts. Additional security risks can arise when the SaaS accounts have excessive rights or privileges to conduct unauthorized activities (e.g., creating or deleting directories, editing or deleting files, sending collaboration invites or requests to other users, changing user roles, etc.).

With regard to file sharing, many SaaS platforms permit an organization or individual to share files with other users and specify permissions associated with the shared files. For example, many SaaS platforms permit users to share files publicly on a network. SaaS platforms also permit users to share files with specific users (e.g., vendors, collaborators, clients, competitors, etc.) for various purposes, such as to collaborate on projects, provide information to customers, and/or for other purposes.

In various scenarios, a single organization may utilize accounts on several different SaaS platforms to share files. In many cases, the files may be shared by the organization's users in a manner that is not in accordance with the organization's internal policies. For example, access privileges associated with a shared file can be set to public when the intent was to share the file with specific users. As another example, a file may be shared with unauthorized users that have not been approved by the organization. In other scenarios, users may forget to restrict access to shared files after an intended expiry date.

Typically, security teams or other users are required to manually monitor and manipulate content and controls associated with each SaaS account on various SaaS platforms to ensure the safety of the shared files and/or to ensure other appropriate security concerns (e.g., associated with multi-factor authentication and/or plugins) are adequately addressed on the various SaaS accounts. However, an organization may have many users, and each user may utilize multiple SaaS platforms. Ensuring the protection of files and content across multiple SaaS accounts can be extremely difficult in these scenarios. Moreover, requiring a security team to manually monitor the accounts associated with each of the organization's users can be time consuming, and may result in unauthorized sharing of files due to human error. This weakens the organization's overall cybersecurity posture, exposes files and data to vulnerabilities, and introduces substantial risk to the organization on multiple fronts.

BRIEF DESCRIPTION OF DRAWINGS

To facilitate further description of the embodiments, the following drawings are provided, in which like references are intended to refer to like or corresponding parts, and in which:

FIG. 3A is an exemplary interface by provided by a security enforcement platform in accordance with certain embodiments;

FIG. 3B is an exemplary interface provided by a security enforcement platform in accordance with certain embodiments;

FIG. 3D is an exemplary interface provided by a security enforcement platform in accordance with certain embodiments;

FIG. 5 is an exemplary interface provided by a security enforcement platform in accordance with certain embodiments;

FIG. 6 is an exemplary security verification message in accordance with certain embodiments.

DETAILED DESCRIPTION OF EXEMPLARY EMBODIMENTS

Figure 1A:
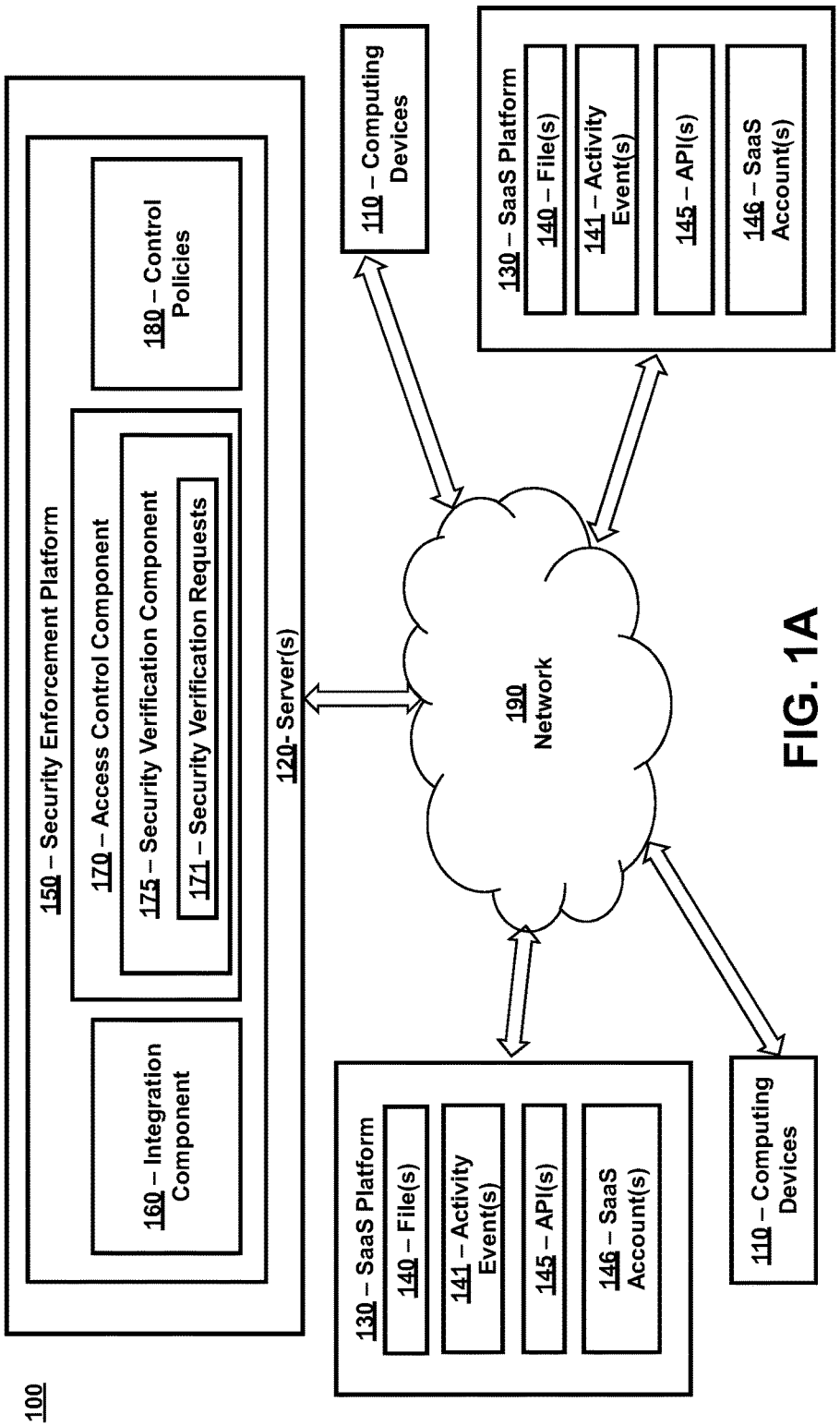
FIG. 1A is a block diagram of an exemplary system for enforcing security features across multiple SaaS platforms in accordance with certain embodiments.

The present disclosure relates to systems, methods, apparatuses, and techniques for enforcing control policies across multiple software as a service (SaaS) platforms and/or other types of software-based services, platforms, and programs. In certain embodiments, a security enforcement platform includes an integration component that is configured to link or integrate accounts on SaaS platforms with the security enforcement platform. The integration component allows for bi-direction communication between the SaaS platforms and the security enforcement platform for enforcing security protocols on the linked SaaS accounts. The security enforcement platform also can include an access control component that enables creation and enforcement of control policies across multiple SaaS platforms. The control policies can be utilized to implement various security features on the linked SaaS accounts. Exemplary control polices can be created to manage or control file sharing activities, file management activities, user account activities, user authentication, plugin usage, and/or other functions and features that may impact the security of the files or content included on the SaaS accounts.

In certain embodiments, the security enforcement platform can serve as a centralized controller that is able to enforce the control policies across multiple SaaS accounts and/or platforms in a uniform manner. In certain embodiments, the security enforcement platform can be configured to dynamically restrict or enable access to the shared files on multiple SaaS platforms based on predefined control policies specified by users of the security enforcement platform. The security enforcement platform also can define and enforce control policies for proactively and preemptively protecting files and data associated with SaaS accounts (e.g., by enforcing usage of authentication protocols and/or restricting or denying access to plugins or applications having broad access privileges). These and other security features are described in further detail below.

In certain embodiments, the security enforcement platform can include a security verification component that automates verification of file sharing activities and/or other types of events. The security verification component can be configured to analyze and aggregate activity events pertaining to each user (e.g., activity events associated with filing sharing, plug-in installations, etc.), and to periodically transmit security verification requests to each user. The security verification requests can provide a summary of the activity events, as well as options that enable the users to approve and/or deny each of the activity events. The security verification component also can generate interfaces that display analytics pertaining to the activity events (e.g., share events) and/or security verification requests. These interfaces can be used to provide security personnel, administrators, and/or other individuals with information pertaining to the sending of security verification requests (e.g., indicating who received the security verification requests, whether share events were approved and denied, etc.), and to permit these individuals to execute functions for ensuring the securing of files associated with share events.

While certain portions of this disclosure may describe applications or examples of cybersecurity technologies in the context of SaaS platforms, it should be recognized that these technologies also can be applied to any type of software solution, application, program, and/or platform. For example, in certain embodiments, the security enforcement platform can alternatively, or additionally, be configured to communicate with and enforce control policies on other types of software applications and programs (e.g., applications installed locally on computing devices and/or other web-based software applications).

As evidenced by the disclosure herein, the inventive techniques set forth in this disclosure are rooted in computer technologies that overcome existing problems in known security and networking systems, specifically problems dealing with controlling and enforcing security control policies in a uniform manner across distinct systems and platforms that employ varying protocols and security features. The technologies described in this disclosure provide a technical solution for overcoming the aforementioned limitations (as well as other limitations) associated with known techniques for controlling security features across different systems and platforms. For example, as explained in further detail below, the cybersecurity technologies described in this disclosure may utilize improved networking techniques to integrate SaaS platforms and/or other types of software solutions with a centralized security enforcement platform. Amongst other things, the centralized security enforcement can be configured to dynamically monitor file sharing activities and other types of activities across multiple SaaS platforms and/or software solutions. Moreover, these technologies permit the security enforcement platform to enforce access control policies on third-party platforms in a uniform manner, despite the inconsistent nature in which various SaaS platforms manage and facilitate access to shared files. Additionally, these technologies permit the security enforcement platform to implement automated verification functions that can be used to approve and/or deny access for share events and/or other activity events. This technology-based solution marks an improvement over existing capabilities and functionalities related to cybersecurity systems by promulgating and enforcing uniform control policies using a centralized control system, allowing customization of the control policies at a granular level, and/or facilitating user-based verification procedure.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Figure 1B:
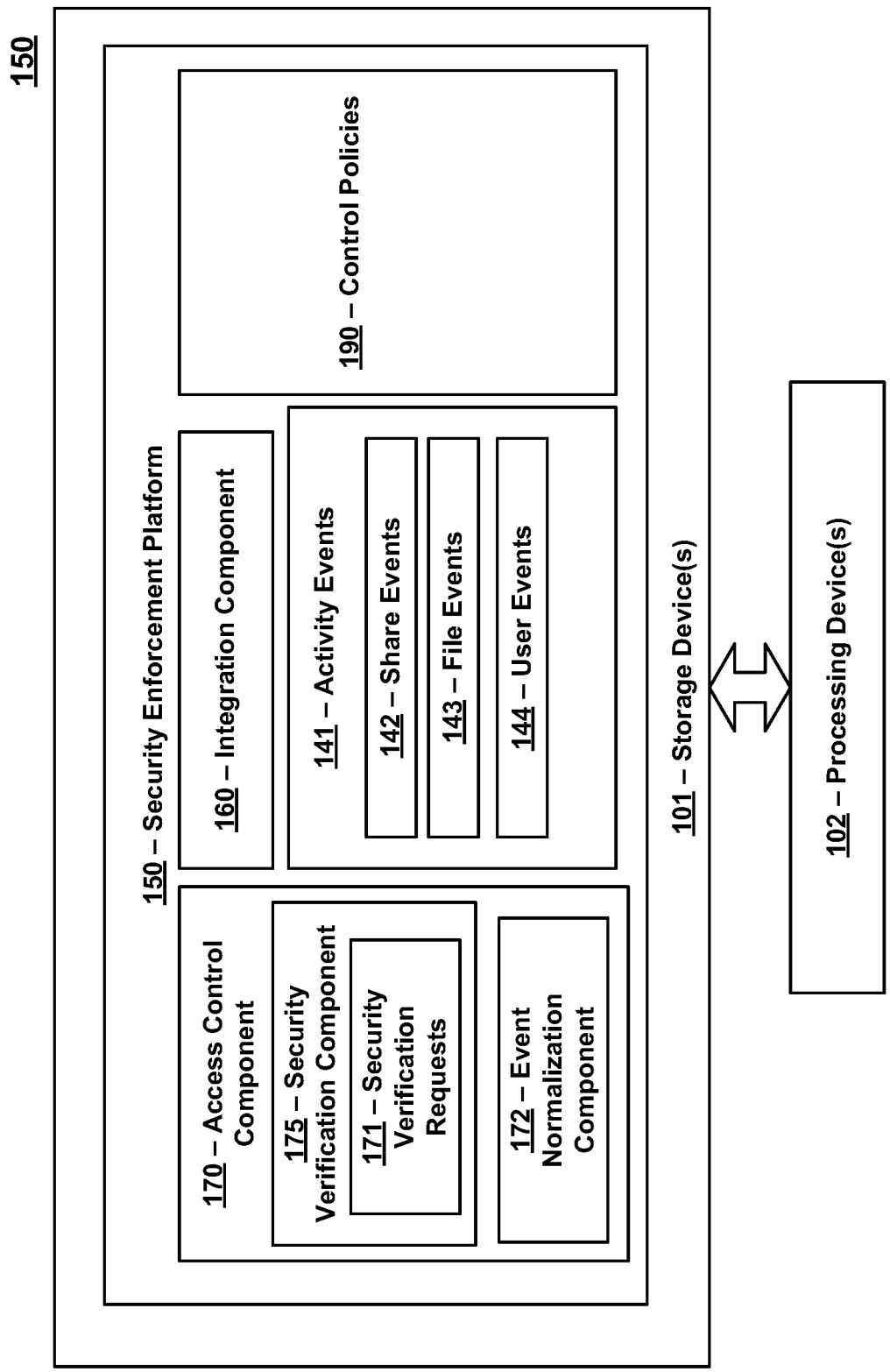
FIG. 1B is a block diagram disclosing an exemplary configuration of a security enforcement platform in accordance with certain embodiments.

FIG. 1A is a block diagram of an exemplary system 100 in accordance with certain embodiments. FIG. 1B is a block diagram disclosing an exemplary configuration of a security enforcement platform 150 in accordance with certain embodiments.

In certain embodiments, the system 100 comprises one or more computing devices 110, one or more servers 120, and one or more SaaS platforms 130 that are in communication over a network 190. A security enforcement platform 150 is stored on, and executed by, the one or more servers 120. The network 190 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. The system 100 may include any number of computing devices 110, servers 120, SaaS platforms 130, and/or security enforcement platforms 150.

All the components illustrated in FIG. 1A, including the computing devices 110, servers 120, SaaS platforms 130, and security enforcement platform 150 can be configured to communicate directly with each other and/or over the network 190 via wired or wireless communication links, or a combination of the two. Each of the computing devices 110, servers 120, SaaS platforms 130, and security enforcement platform 150 can also be equipped with one or more transceiver devices, one or more computer storage devices 101 (e.g., RAM, ROM, PROM, SRAM, etc.), and one or more processing devices 102 that are capable of executing computer program instructions.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more computer storage devices 101 can include (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the computer storage devices 101 can be physical, non-transitory mediums.

In certain embodiments, the computing devices 110 may represent desktop computers, laptop computers, mobile devices (e.g., smart phones, personal digital assistants, tablet devices, vehicular computing devices, wearable devices, and/or any other device that is mobile in nature), and/or other types of devices. The one or more servers 120 may generally represent any type of computing device, including any of the computing devices 110 mentioned above. In certain embodiments, the one or more servers 120 comprise one or more mainframe computing devices that execute web servers for communicating with the computing devices 110, SaaS platforms 130, and/or other applications and devices over the network 190 (e.g., over the Internet).

In certain embodiments, each SaaS platform 130 may host one or more applications that are made available to users over the network 190. In some cases, the applications offered by the SaaS platform 130 may represent web-based applications. Each SaaS platform 130 may be hosted on one or more servers (e.g., which may be the same or similar to server 120 described herein). Each SaaS platform 130 may offer separate accounts 146 to users (e.g., which may correspond to individuals, organizations, corporations, businesses, and/or other entities). In certain embodiments, in response to a user creating an account 146 on a SaaS platform 130, the SaaS platform 130 may create a separate instance of one or more applications offered by the platform and the separate instance may be associated with the account. In some cases, each of the one or more of the SaaS platforms 130 may permit users to upload, create, edit, and/or share files 140 with other users. For example, each SaaS platform 130 may permit a user to share one or more files 140 with internal users (e.g., employees within that user's organization) and/or external users (e.g., third parties such as vendors and customers).

The services and functions provided by each SaaS platform 130 can vary. In some examples, the SaaS platforms 130 may provide file storage services, social networking services, e-mail services, document processing services, data hosting services, enterprise business services, project collaboration services, and many other types of services. Exemplary providers of the SaaS platforms 130 may include products and/or services such as Slack®, Zoom®, Facebook®, Google Workspace®, DocuSign®, Dropbox®, Trello®, ClickUp®, Vimeo®, Amazon Web Services®, Data Dog®, Net Suite®, Twillo®, Splunk®, WebEx®, Zenefits®, Pipedrive®, Box®, Now®, and many others.

As mentioned above, some or all of the SaaS platforms 130 may provide functions that permit files 140 associated with a user's account to be shared with various third parties. For example, some SaaS platforms 130 (e.g., such as Dropbox®) may permit a user to create an account that includes functions for storing files and sharing files 140 with other users. Similarly, some SaaS platforms 130 (e.g., such a Slack®) may permit users to collaborate on shared files 140, and/or may include functions for creating, editing, and/or deleting the files 140. The files 140 shared using the SaaS platforms 130 may be transmitted over the network 190 to accounts associated with other users and/or may be made publicly available on the network 190.

Some or all of the SaaS platforms 130 also may include functions for authenticating users. For example, in some cases, the SaaS platforms 130 can enable users to configure a multi-factor authentication (MFA) feature or may require a user to provide two or more verification factors to gain access to an SaaS account 146 and/or files 140 associated with an SaaS account 146. Some or all of the SaaS platforms 130 also may provide plugins that can be installed by users (e.g., installed in web browsers) to access various features and functions provided by the SaaS platforms 130.

In certain embodiments, the security enforcement platform 150 is stored on, and executed by, the one or more servers 120. In some cases, the security enforcement platform 150 itself can represent a SaaS platform and/or cloud-based application that runs on the one or more servers 120. An organization or user may create an account on the security enforcement platform 150 to control and manage security features on one or multiple SaaS platforms 130 associated with the organization or user. For example, the security enforcement platform 150 can be configured to perform any and all functions associated with controlling, managing, enabling, and/or restricting access to files 140 (and/or other files) provided by, or included on, the accounts 146 of SaaS platforms 130. The security enforcement platform 150 also may be utilized to control and manage security features related to user authentication protocols and plugins associated with the SaaS accounts 146. The security enforcement platform 150 also may be utilized to control and manage other activities performed using the SaaS accounts 146 (e.g., adding or editing files, changing user roles, changing passwords, etc.). In certain embodiments, the security enforcement platform 150 can be configured to implement or provide a variety of additional cybersecurity security, digital security, and/or network security functions as well.

The files 140 included on, or accessed by, the SaaS platforms 130 can vary greatly and may include any file type. The files 140 may generally relate to any type of digital content. For example, files 140 may include word processing documents, images, source code files, audio files, video files, database files, spreadsheets, portable document format (PDF) files, folders or directories, and many other types of files. In some cases, the users may import and/or upload the files 140 to the SaaS platforms 130. Additionally, some of the SaaS platforms 130 may permit users to create new files 140 and/or edit the files 140. As mentioned above, each of the SaaS platforms 130 also may provide functions that enable users to share the files 140.

The security enforcement platform 150 can be configured to monitor all activities associated with sharing the files 140 included on the SaaS platforms 130 and to enforce control policies 180 for managing the manner in which the files 140 are shared. Examples of how of the security enforcement platform 150 performs these monitoring functions are described in further detail below.

In certain embodiments, the security enforcement platform 150 includes an integration component 160 that permits users to link and/or integrate their accounts 146 on SaaS platforms 130 with the security enforcement platform 150. For example, upon accessing an account on the security enforcement platform 150, the integration component 160 may permit the user to identify accounts 146 on one or more SaaS platforms 130 that are associated with the user. For each identified SaaS account 146, an authorization framework may enable the integration component 160 to securely access some or all of the user's data associated with the SaaS account 146. In certain embodiments, the integration component 160 may communicate with one or more application programming interfaces (APIs) provided by the SaaS platforms 130 to integrate the SaaS accounts 146 with the security enforcement platform 150 and to access data associated with the SaaS accounts 146.

In certain embodiments, the integration component 160 can utilize OAuth 2.0 and/or other types of authorization frameworks to integrate SaaS accounts 146 and access data associated with the SaaS accounts 146. Upon linking or integrating a SaaS account 146 with the security enforcement platform 150, the integration component 160 allows for bi-directional communication between the SaaS platforms 130 and the security enforcement platform 150.

After a SaaS account 146 is linked to, or integrated with, the security enforcement platform 150, the security enforcement platform 150 can monitor and/or track all security features associated with the SaaS account 146. In some examples, the security enforcement platform 150 can receive activity events 141 from the SaaS accounts 146 that pertain to sharing files 140, authenticating users, installing plugins, manipulating files 140, changing user roles or account information, changing account passwords, and/or other related features and functions that can affect the security of the SaaS account 146 or data associated with the SaaS account 146.

Various types of activity events 141 can be received and analyzed by the security enforcement platform 150. The activity events 141 can generally indicate any type of activity that is conducted on the SaaS accounts 146. Exemplary activity events 141 can include, inter alia, share events 142, file events 143, and/or user events 144.

Share events 142 can include any activity event 141 associated with sharing files 140 and/or other data using a SaaS account 146. For example, share events 141 may indicate that a SaaS account 146 is sharing a file 140 and/or attempting to share a file 140. Share events 142 also may be generated which indicate that a user with whom a file 140 has been shared is attempting to access, view, create, edit, and/or delete the shared file 140.

File events 143 can include any activity event 141 associated with manipulating files 140 using a SaaS account 146. Exemplary file events 143 can generated in response to any or all of the following: copying files, folders, and/or directories; pasting files, folders, and/or directories; creating, editing, and/or deleting files, folders, and/or directories; renaming files, folders, and/or directories; uploading files, folders, and/or directories to SaaS accounts; downloading files, folders, and/or directories from SaaS accounts; and/or moving or changing locations of files, folders, and/or directories.

User events 144 can include any activity event 141 associated with manipulating details of a SaaS account 146, designating privileges of a SaaS account 146, and/or manipulating user groups associated with a SaaS account 146. Exemplary user events 144 can generated in response to any or all of the following: changing user roles associated with SaaS accounts (e.g., designating administrator roles to user accounts); creating, editing, and/or deleting user groups; approving or denying user requests; changing passwords associated with SaaS accounts; changing contact information associated with SaaS accounts; adding and/or removing users from user groups or teams; and/or changing user statuses (e.g., invited, joined, suspended, terminated, etc.).

Many other types of activity events 141 can be generated by the SaaS accounts 146. For example, activity events 141 also may indicate that a plugin has been installed and/or that a plugin is attempting to access files 140 and/or other content associated with a SaaS account 146. Activity events 141 also may indicate whether or not a user utilized one or more authentication protocols (e.g., MFA) to access a SaaS account 146 and/or file 140 associated with a SaaS account 146. Activity events 141 also may indicate that a user is attempting to install or uninstall a script, add-on, application, and/or other software that interacts with a SaaS account 146.

Each activity event 141 may include metadata that provides information related to the action or attempted action being undertaken by a corresponding SaaS account 146. For example, in response to a user attempting to share a file 140 via a SaaS account 146, an activity event 141 (e.g., a share event 142) may be generated that includes metadata identifying the SaaS account 146 and/or user attempting to share the file 140, an identifier indicating or identifying the file 140 that is attempted to be shared, access privileges associated with sharing the file 140 (e.g., indicating whether public vs. limited user access was specified and/or whether an expiry date has been specified for accessing the file), a timestamp indicating when the event was created, and/or one or more intended recipients of the file 140. Similarly, after a file 140 has been shared, subsequent activity events 141 may be generated in response to recipient users accessing, viewing, editing, and/or deleting the shared file 140. Each activity event 141 may include corresponding metadata (e.g., identifying the recipient user who is attempting to access the file 140, indicating the type of activity being attempted, and a timestamp associated indicating when the event was initiated).

All activity events 141 associated with the files 140 being shared may be received by the security enforcement platform 150. In certain embodiments, web hooks provided by, or accessible through, each of the SaaS platforms can be configured to automatically transmit the activity events 141 to the security enforcement platform 150. Additionally, or alternatively, the security enforcement platform 150 may periodically poll the APIs 145 of the SaaS platforms 130 and/or SaaS accounts 146 to pull and retrieve the activity events 141. Regardless of how the activity events 141 and corresponding metadata are provided to the security enforcement platform 150, the activity events 141 and corresponding metadata may be analyzed by the access control component 170 to enforce control policies 180 on the SaaS accounts 146 and/or files 140 associated with the SaaS accounts 146, as explained in further detail below.

The access control component 170 can permit users to define control policies 180 for managing security across multiple SaaS accounts 146 and/or files 140 stored across multiple SaaS platforms 130, and to enforce the control policies 180 across the SaaS platforms 130 and SaaS accounts 146. In certain embodiments, after a user has accessed an account on the security enforcement platform 150 (e.g., by logging in with a username and password) and applicable SaaS accounts 146 are linked to the security enforcement platform 150, one or more graphical user interfaces (GUIs) provided by the access control component 170 may enable the user to define control policies 180 for implementing security features on the SaaS accounts 146 and managing how files 140 associated with the SaaS accounts 146 are shared. FIG. 3A-3E, which are described below, disclose exemplary interfaces that permit users to create or define control policies 180.

In certain embodiments, the access control component 170 can include a security verification component 175 that executes functions and enforces control policies 180 associated with verifying file sharing activities and/or other activities conducted by users of the SaaS platforms 130. The security verification component 175 can enforce control policies 180 that are configured to automatically and/or periodically transmit security verification requests 171 to users in response to detecting share events 142 (e.g., activity events 141 indicating that files and/or data have been shared, or are attempting to be shared), file events 143, user events 144, and/or other activity events 141.

For example, in some scenarios, a security verification request 171 can be sent to a user periodically (e.g., daily, weekly, monthly, etc.) which identifies all share events 142 initiated by the user during a recent time period. Likewise, security verification requests 171 can be transmitted periodically which identify file events 143 and/or user events 144 initially by a user during a recent time period (e.g., indicating changes to files 140, password changes, etc.). Additionally, or alternatively, a security verification request 171 can be sent to the user immediately after the security verification component 175 detects that the user has initiated a share event 142, file event 143, and/or user event 144.

The security verification requests 171 can be transmitted to users in various ways. For example, the security verification requests 171 can be transmitted to, and accessed by users through, inboxes or messaging features provided on accounts of one or more SaaS platforms 130. Additionally, or alternatively, the security verification requests 171 can be transmitted to, and accessed by users through, e-mail inboxes, inboxes accessible via the electronic security platform, text messages, instant messaging systems, and/or other electronic messaging means.

In some particularly useful scenarios, each security verification request 171 can identify one or more share events 142 associated with a user. Each security verification request 171 can include various information associated with each of the share event 142, e.g., such as information indicating one or more recipients of the share event 142, a date and time the share event 142 was generated, a SaaS platform 130 that was used to initiate the share event 142, one or more files 140 that were shared, sharing privileges (e.g., public vs. private) associated with the share event 142, and/or other related information. Some or all of this information included in the security verification request 171 can be extracted from metadata associated with the share event 142.

Users can review the information in the security verification request 171 to determine if activity events (e.g., share events 142, file events 143, and/or user events 144) initiated from their SaaS accounts were authorized and valid, and to identify instances where accounts were potentially hacked or misused. Users also can review the information included in the security verification request 171 to determine if the parameters of an intended activity were properly specified (e.g., appropriate privileges were specified, appropriate recipients were specified, intended files were shared, etc.).

For each activity event 141 (e.g., share event 142) identified in a security verification request 171, the security verification request 171 can include options that enable a user to approve or deny the activity event 141. If a user selects an approval option, a message can be transmitted to the security enforcement platform 150 indicating that the corresponding activity event 141 (e.g., share event 142) was approved by the user. In some embodiments, upon receiving an approval message, the security enforcement platform 150 may allow files or data to be shared pursuant to a share event 142 and/or may permit other activities to be conducted (e.g., other activities associated with file events 143 and/or user events 144). If a user selects a denial option, a message can be transmitted to the security enforcement platform 150 to revoke the activity event 141 (e.g., to revoke a share event 142 and/or revoke sharing privileges for one or more files 140 associated with the share event 142). In some embodiments, upon receiving a denial message, the security enforcement platform 150 can rescind the activity event 141 (e.g., share event 142, file event 143, user event 144, and/or other activity event 141), deny access to any files or data associated with a share event 142, and/or prohibit activities associated with the activity event 141.

FIG. 6 illustrates an example of a security verification request 171. The security verification request 171 includes a policy section identifying a control policy 180 that caused the transmission of the security verification request 171. The security verification request 171 also includes an event section that provides details pertaining to a share event 142 that initiated the transmission of the security verification request 171. The security verification request 171 further includes an actions section that identifies actions specified in the control policy 180 that initiated the transmission of the security verification request 171. In this section, options can be presented that enable the user to approve the share request or deny the share request.

Similar types of security verification requests 171 can be transmitted in response to detecting file events 143, user events 144, and/or other types of activity events 141. Such security verification requests 171 can summarize metadata related to the events, as well as options for approving or denying the event.

Returning to FIGS. 1A and 1B, the security verification component 175 can provide a self-verification and/or user-based verification mechanism that permits each user to approve or deny their own sharing activities and/or corresponding activity events 141. This avoids the need for security personnel and/or administrators to manually communicate with each user regarding whether sharing activities or activity events 141 pertaining to that user were intentionally implemented or authorized. As explained in further detail below, the security verification component 175 also can provide analytics and verification interfaces that enable security personnel and/or administrators to view details of all sharing activities for each of the users, and to execute various functions to ensure files 140 are secure (e.g., to revoke sharing activities, modify sharing privileges, communicate with users who shared files 140, etc.).

FIG. 3A is an interface 300A that includes a menu of policy template options 330 that may be selected to create exemplary control policies 180. The policy templates (and the corresponding control policies 180 associated with the templates) are intended to be exemplary. In certain embodiments, some or all of the policy templates illustrated on the interface 300A can be omitted and/or the interface 300A may include additional policy templates that are not shown.

The menu on this exemplary interface 300A comprises and/or provides access to policy templates for defining control policies 180 as described below.

Temporary Sharing Template Option 331: This template can permit users, inter alia, to create one or more control policies 180 for controlling the expiration of shared files 140. In certain embodiments, a control policy 180 may be defined that cause links for sharing files 140 on one or more specified SaaS accounts and/or users to expire automatically after a predetermined time.

Deny List Template Option 332: This template can permit users, inter alia, to create one or more control policies 180 that prohibit sharing of files 140 with one or more recipient users. For example, this template may be used to create a control policy 180 that restricts one or more recipient users from receiving files 140 and/or which prohibits content from being shared with unauthorized users. In certain embodiments, this template (or another template) also may be used to prohibit specified users and/or SaaS accounts linked to the security enforcement platform 150 from sharing files 140 entirely. For example, in some cases, this template can be used to prevent an organization's internal users from sharing files 140 with external users.

Public Asset Template Option 333: This template can permit users, inter alia, to create one or more control policies 180 for controlling and/or managing files 140 that are shared publicly. For example, in some cases, the template may be used to detect files 140 that are currently being shared publicly and to prevent or restrict access to those files 140, thus converting public files to private files. In response to detecting new share attempts, this control policy 180 also may be utilized to proactively prevent new or additional files 140 from being shared publicly.

Cleanup Inactive Permissions Template Option 334: This template can permit users, inter alia, to create one or more control policies 180 for inactive files. For example, this template can be used to create a control policy 180 that automatically removes sharing permissions for shared files 140 that have remained inactive for a specified time period.

MFA Disable Warning Template Option 335: This template can permit users, inter alia, to create one or more control polices 180 relating to multi-factor authentication (MFA). In some cases, this template permits a control policy 180 to be created which prevents a user from accessing a SaaS account that does not utilize MFA. In other examples, this template can be utilized to restrict or limit sharing of files for accounts that do not utilize MFA. In certain embodiments, the control policy 180 created using this template may transmit a warning notification to one or more individuals (e.g., administrators and/or security personnel associated with an organization) in response to detecting that a user sending or receiving a shared file 140 does not have MFA configured.

Data Retention Template Option 336: This template can permit users, inter alia, to create one or more control polices 180 associated with removing or deleting shared files 140 (and/or other files 140 included on a SaaS account) after a specified time period. For example, this template can create a control policy 180 that causes all files or specified files to be deleted after a designated timeframe.

Sharing Approval Model Template Option 337: This template can permit users, inter alia, to create one or more control polices 180 associated with establishing an approval mechanism or model for sharing files. For example, in some cases, this template may prevent a user and/or SaaS account from sharing any file 140 (or specifically designated files) without approval by one or more designated administrators, security team individuals, and/or other users.

Plugin Deny List Template Option 338: This template can permit users, inter alia, to create one or more control polices 180 that restrict and/or prevent plugins from being installed (e.g., such as plugins that have broad permissions to access and/or utilize files 140 and other content associated with the SaaS accounts). The plugins may be provided by the SaaS platforms 130 and/or may be utilized in connection with SaaS accounts provided by the SaaS platforms 130.

Time Restrictions Template Option 339: This template can permit users, inter alia, to create one or more control polices 180 that prevent external users (or other users) from accessing shared files 140 during a certain time of day and/or on certain dates. A control policy 180 created using this template can permit users to specify timeframes when the files 140 are not accessible.

Access Lockdown Template Option 340: This template can permit users, inter alia, to create one or more control polices 180 that restrict access to files 140 and/or SaaS accounts in response to SOAR (Security Orchestration, Automation, and Response) signals received at the security enforcement platform 150. For example, in response to receiving a SOAR signal that identifies a potential cybersecurity or security threat, a control policy 180 defined using this template can automatically prevent one or more SaaS accounts from sharing files 140 and/or can automatically restrict access to one more files 140 included on linked SaaS accounts.

Access Consent Request Template Option 341: This template can permit users, inter alia, to create one or more control polices 180 for automatically obtaining data access consent from users (e.g., external users) accessing shared files 140. For example, in response to an access attempt on a shared file 140, an external user may be required or prompted to provide consent to specified conditions (e.g., regarding confidentiality and/or other conditions) before accessing the files 140.

Custom Template Option 342: This template can permit users, inter alia, to create one or more customized control polices 180. In certain embodiments, the custom control policies 180 can combine any or all of the policy features and functions associated with the templates described this disclosure.

In some embodiments, this interface 330A (or another interface) also may include an option for a sharing verification template. This template can permit users, inter alia, to create one or more control polices 180 that automatically transmit security verification requests 171 to users (e.g., users who operate SaaS accounts) in response to detecting sharing events being initiated by those users. For example, as explained above, in response to a user sharing a file 140, a control policy 180 defined using this template can cause a security verification request 171 to be transmitted to the user, which requests the user to approve or deny the share event. In some cases, the security verification requests 171 may be sent periodically (e.g., daily, weekly, monthly, etc.) to each user summarizing all share events initiated by the user, and requesting the user to separately approve or deny each share event.

In some embodiments, the interface 330A also may include various options for controlling file events 143, user events 144, and/or other types of activity events 141. For example, options may be presented on the interface 330A that enable users to access templates for controlling file events 143 related to any or all of the following: copying files, folders, and/or directories; pasting files, folders, and/or directories; creating, editing, and/or deleting files, folders, and/or directories; renaming files, folders, and/or directories; uploading files, folders, and/or directories to SaaS accounts; downloading files, folders, and/or directories from SaaS accounts; and/or moving or changing locations of files, folders, and/or directories.

Similarly, options may be presented on the interface 330A that enable users to access templates for controlling user events 144 related to any or all of the following: changing details of a SaaS account 146; designating privileges to a SaaS account 146; changing user groups associated with a SaaS account 146; changing user roles associated with SaaS accounts (e.g., designating administrator roles to user accounts); creating, editing, and/or deleting user groups; approving or denying user requests; changing passwords associated with SaaS accounts; changing contact information associated with SaaS accounts; adding and/or removing users from user groups or teams; and/or changing user statuses (e.g., invited, joined, suspended, terminated, etc.).

As mentioned above, the access control component 180 can generate GUIs that display the aforementioned templates (as well as other templates) for defining control policies 180. Users can provide feedback and inputs via the computing devices 110 to customize and define the control policies 180 as desired. After defining a control policy 180, a user may select an option to launch or deploy the control policy 180.

Figure 3C:
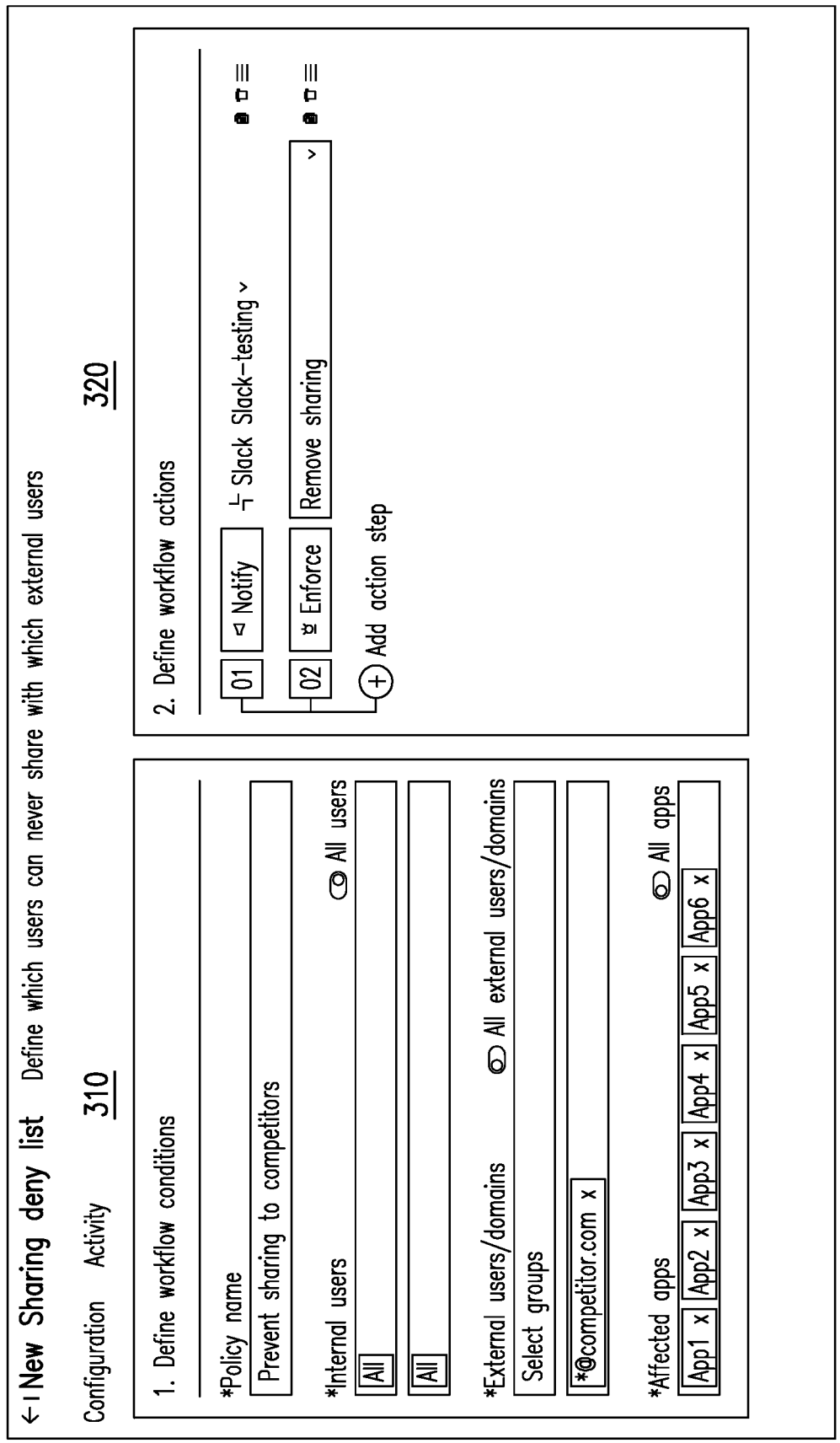
FIG. 3C is an exemplary interface provided by a security enforcement platform in accordance with certain embodiments.
Figure 3E:
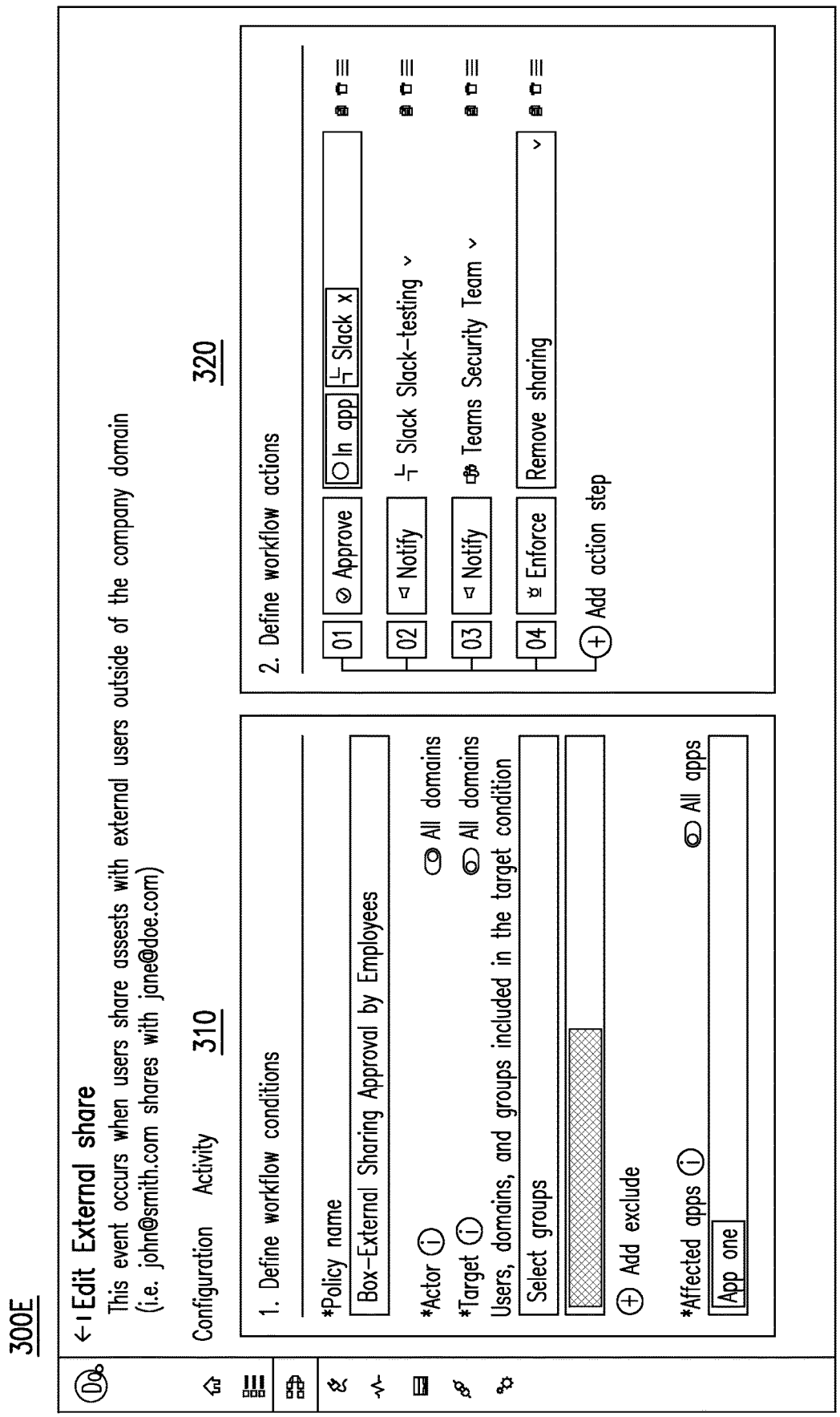
FIG. 3E is an exemplary interface provided by a security enforcement platform in accordance with certain embodiments.

FIG. 3B-3E illustrate exemplary interfaces for defining various control policies 180 using exemplary policy templates. FIG. 3B discloses an interface 300B that includes an exemplary temporary sharing template for defining and creating a control policy 180 that implements temporary sharing of files 140. FIG. 3C discloses an interface 300C that includes an exemplary deny list template for defining and creating a control policy 180 that prevents or limits the ability of specified recipient users from accessing files 140. FIG. 3D discloses an interface 300D that includes an exemplary public assets template for defining and creating a control policy 180 that automatically identifies and removes public permissions from files 140. FIG. 3E discloses an interface 300E that includes an exemplary sharing verification template for defining and creating a control policy 180 that automatically requests approval and/or denial of sharing activities initiated by users. Similar interfaces can be provided that enable users to prohibit, limit, and/or control file events 143, user events 144, and/or other activity events 141.

As shown in these interfaces, each of the policy templates may include a workflow conditions section 310 and a workflow actions section 320. Users can customize the criteria associated with the workflow conditions section 310 and workflow actions section 320 to define the control policies 180 in various ways. After the user has customized these sections of the template, the user may select an option to launch and implement the control policy 180 that has been defined.

The workflow conditions section 310 of the templates permits users to specify certain filters that apply to the control policies 180. For example, the workflow conditions section 310 may permit a user to identify specific users (e.g., specific internal users and/or externals users) to whom the control policies 180 may apply. In certain embodiments, the specified users, who will be subjected to the control policies 180, can be identified by their e-mail addresses, usernames, and/or by group labels (e.g., "Vendors," "Customers," "Internal Users," "External Users," etc.) that are associated with a group of users. The workflow conditions section 310 also can permit the user to specify the SaaS platforms 130 to which the control policy 180 being created will apply. This can permit the user to create separate control policies 180 for each SaaS platform 130 that is integrated with the user's account on the security enforcement platform 150 and/or to create a broad control policy that applies across all specified SaaS platforms 130.

In certain embodiments, the workflow conditions section 310 also may include fields or inputs that permit a user specify a particular file 140 (or group of files 140) to which a control policy 180 will apply. For example, in some cases, the templates can permit a user to create customized control policies for specific files 140 or groups of files 140 at a granular level.

The workflow actions section 320 of the templates permits users to specify actions that are to be executed by the control policies 180. In some cases, these actions may be executed by the access control component 170 in response to detecting activity events 141 that match the filtering criteria specified by the workflow conditions section 310 of a corresponding control policy 180. Exemplary actions that may be executed in connection with a control policy 180 can include any or all the following.

Enforce Action: In some cases, this action causes a control policy 180 to remove or restrict certain permissions associated with a file 140 being shared or attempting to be shared. For example, this action can be used to automatically remove public permissions for some or all files 140 that satisfy the filtering criteria specified in the workflow conditions section 310. Similarly, this action can be used to prevent external users from accessing a file 140 which has been shared or which is attempting to be shared by a user. As another example, this action can be used to limit the type of access that is permitted for shared files 140 (e.g., by only permitting viewing, but not editing or deletion of shared files 140).

Approve Action: This action causes a control policy 180 to require or request approval by one or more predesignated users (e.g., administrators, security team personnel, or other approved users) before a file 140 can be shared and/or accessed.

Notify Action: This action causes a control policy 180 to transmit automatically a notification to one or more users (e.g., administrators, security team personnel, and/or other authorized users). For example, in response to detecting an activity event 141 indicating that a user is sharing a file 140 or that a recipient user is accessing a previously shared file 140, a control policy 180 may cause a notification to be transmitted to security personnel and/or other users to notify them of the sharing activity. In customizing the notify action, a user can specify that notifications are sent in various ways and formats (e.g., via e-mail, text message, etc.). In some cases, a user may specify that notifications are to be presented on interfaces provided by the security enforcement platform 150 and/or that are notifications are pushed to the SaaS applications and output on interfaces provided in connection with the SaaS applications.

Wait Action: This action permits a user to specify a time period (e.g., a day, week, or month) associated with a control policy 180. For example, in the context of a control policy 180 that facilitates temporary sharing of files 140, the wait action may be utilized to specify the date and/or time when the permissions to share the files 140 will expire. After the time period associated with a wait action has expired, the control policy 180 can execute other actions (e.g., enforce actions, notify actions, etc.) that has been added to the control policy 180.

As mentioned above, the exemplary interface 300E illustrated in FIG. 3E includes a sharing verification template for defining and creating a control policy 180 that transmits security verification requests 171 soliciting approval and/or denial of sharing activities initiated by users. In certain embodiments, the security verification requests 171 are transmitted in response to users sharing files 140 and/or other data included on SaaS platforms 130 with external users (e.g., customers, clients, and/or other third-party users who are not directly affiliated with a company or organization). In some cases, the security verification requests 171 may additionally, or alternatively, be applied to share events in which files and/or other data is shared with internal users (e.g., employees within a company or organization).

In certain embodiments, the interface 300E may be provided by the security verification component 175. The security verification component 175 also can be configured to execute and enforce the control policies 180 created using this interface 300E.

Multiple control policies 180 can be created using the template shown in the interface 3000E, each of which is customized to facilitate sending of security verification requests 171 in different scenarios. For example, a control policy 180 can be created to send security verification requests to users for any and all sharing events that are attempting to share files 140 or data with external users. Control policies also can be created to send security verification requests 171 in particular scenarios (e.g., only when files or data are shared with particular recipients and/or only when particular files 140 are selected for sharing). Control policies also can be created to send security verification requests 171 for file events 143, user events 144, and/or other activity events 141.

The workflow conditions section 310 allows the users to define the criteria for determining whether security verification requests 171 are to be transmitted in response to sharing activities and/or other activity events 141. The workflow conditions section 310 includes a policy name field, which permits a user to assign a name to a control policy 180 being created. The workflow conditions section 310 also includes options and/or filters for customizing scenarios in which the security verification requests 171 are to be transmitted in response to the detection of sharing attempts (or other activity events 141) by the access control component 170 and/or security verification component 175.

The workflow conditions section 310 can include options or filters for identifying users (e.g., employees within an organization) to whom the control policy will apply (e.g., the users that will receive security verification requests 171 in connection with a control policy 180 being defined on the interface 300E). For example, a share event 142 initiated by an identified user may cause that user to receive a security verification request 171, which will ask or request the user to approve or deny the initiated sharing activity. One selectable option (labeled "All Domains" adjacent to the "Actor" label) can permit a user creating a control policy 180 to easily specify that the control policy 180 should apply to all users. Other options in the workflow conditions section 310 also permit specific users to be selected for and/or excluded from the control policy 180.

The workflow conditions section 310 also includes options or filters for identifying specific recipients (e.g., particular external users) that may cause the sending of the security verification requests. For example, if a file 140 is shared with an identified recipient and/or domain address, a security verification request may be transmitted to a user that initiated the share attempt, which requests the user to approve or deny the share attempt. An option (labeled "All Domains" adjacent to the "Target" label) permits a user creating a control policy 180 to easily specify that the control policy 180 should apply to all external users. The filters in the workflow conditions section 310 also permit specific recipients and/or domain addresses to be selected for and/or excluded from the control policy 180.

The workflow conditions section 310 also includes options or filters (labeled "Affected apps") that enable a user creating a control policy 180 to identify the SaaS platforms 130 to which the control policy 180 should be applied. For example, a user can use this option or filter to indicate that security verification requests 171 are only to be transmitted in connection with the control policy 180 if the share event 142 and/or other activity event 141 originated from one or more identified SaaS platforms 130. A user can select an option (labeled "All apps") to easily apply the control policy 180 to all SaaS platforms 130 integrated with the security enforcement platform 150, or the user can designate one or more of specific SaaS platforms 130 to which the control policy 180 should be applied.

A user creating a control policy 180 can manipulate the various options or filters (e.g., identifying applicable sharing users, recipients, and/or SaaS platform 130) to customize the criteria for the control policy 180 being created (e.g., for customizing the scenarios in which security verification requests 171 are transmitted). After the control policy 180 is deployed, the security enforcement platform 150 (e.g., the access control component 170 and/or security verification component 175) can monitor activity events 141 generated by the SaaS platforms 130, and compare the activity events 141 to the criteria specified in the workflow conditions section 310. Any activity events 141 and/or share events 142 (e.g., including share attempts with external users) that satisfy the criteria specified in the workflow conditions section 310 will cause the security enforcement platform 150 to transmit security verification requests 171 pursuant to the actions identified in the workflow actions section 320. As mentioned above, the security verification requests 171 can be transmitted periodically (e.g., weekly) and/or immediately after an activity event 141 and/or share event 142 is detected.

As mentioned above, the workflow actions section 320 may permit users to specify various actions (e.g., such as the enforce actions, approve actions, notify actions, and/or wait actions described above) in defining control policies 180. In this example shown on interface 300E, the workflow actions section 320 is configured with an approve action, two notify actions, and an enforce action.

Upon determining that an activity event 141 and/or share event satisfies the criteria or conditions specific in the workflow conditions section 310, the approve action will cause a security verification message 171 to be sent to the user who originated the event, which requests approval or denial of the activity event 141. A customizable field or option associated with the approve action permits a user defining the control policy 180 to specify where the security verification message will be sent (e.g., to the user's e-mail, SaaS account, text message, etc.).

The notify actions also can be used to send notifications to security personnel, administrators, and/or other individuals. These notifications can include any information pertaining to the detected activity event (e.g., identifying a user who initiated a share event, intended recipients, files shared, etc.). A customizable field or option associated with the notify actions permits a user defining the control policy 180 to specify who will receive the notifications.

An enforce action also can be used to deny the activity event and/or prevent the files 140 or data (which are the subject of the share event) from being shared. For example, with respect to share events 142, the enforce action may remove sharing privileges in response to a user selecting a denial option on security verification request and/or in response to security personal denying the share event. Similarly, with respect to file events 143 and user events 144, the enforce action may prevent files or directories from being altered and/or may prevent changes being made to user accounts.

After the filters and actions in the workflow conditions section 310 and workflow actions section 320 are specified, the user creating the control policy 180 can select a submission option to save the control policy 180 and/or deploy the control policy 180.

While FIG. 3B-3E disclose exemplary templates for particular control policies 180, it should be recognized that similar interfaces also may be provided for other types of control policies (including, but not limited to, control policies 180 that are associated with the various template options described herein). Each interface may include a workflow conditions section 310 that permits the user to select filters (e.g., for identifying users, SaaS platforms 130, and/or files) to which the control policy will apply, as well as a workflow actions section 320 that identifies the actions that will be executed in response to identifying activity events that match the filtering criteria.

As mentioned above, the security enforcement platform 150 can monitor all activity events 141 generated by integrated or linked SaaS accounts 146. In response to detecting an activity event 141 that matches the filtering criteria of a control policy 180 (which can be specified in the workflow conditions section 310 when the control policy 180 is defined), the control policy 180 will execute any actions associated with the control policy 180 (which can be specified in the workflow actions section 310 when the control policy 180 is defined).

Each SaaS platform 130 may generate activity events 141 of differing types and having differing metadata. In some scenarios, the metadata associated with activity events 141 from one or more particular SaaS platforms 130 may not include sufficient information to permit the access control component 170 to determine whether the activity events 141 are subject to the control policies 180. For example, certain activity events 141 generated by a particular SaaS platform 130 may not identify the specific permissions that a SaaS user is attempting to assign to a file 140 which is attempting to be shared. Likewise, the activity events 141 generated by another SaaS platform 130 may not identify the intended recipients of the file 140 which is attempting to be shared.

To address the inconsistent manner in which SaaS platforms 130 generate activity events 141, the access control component 170 (and/or other portion of the security enforcement platform 150) may include an event normalization component 172 (FIG. 1B) that assists with retrieving any missing information that may be needed to determine whether control policies 180 apply to the activity events 141. In certain embodiments, in response to the access control component 170 receiving an activity event 141 that does not include sufficient information for evaluating whether one or more of the control policies 180 apply, the event normalization component 172 can be configured to automatically transmit one or more queries to the API 145 associated with the SaaS platform 130 and/or SaaS account from which the activity event 141 originated. The one or more queries executed on the API 145 can be utilized to supplement the metadata associated with the activity event 141 and/or to gather any missing information that may be needed by the access control component 170 to evaluate the applicability of the control policies 180.

Figure 4A:
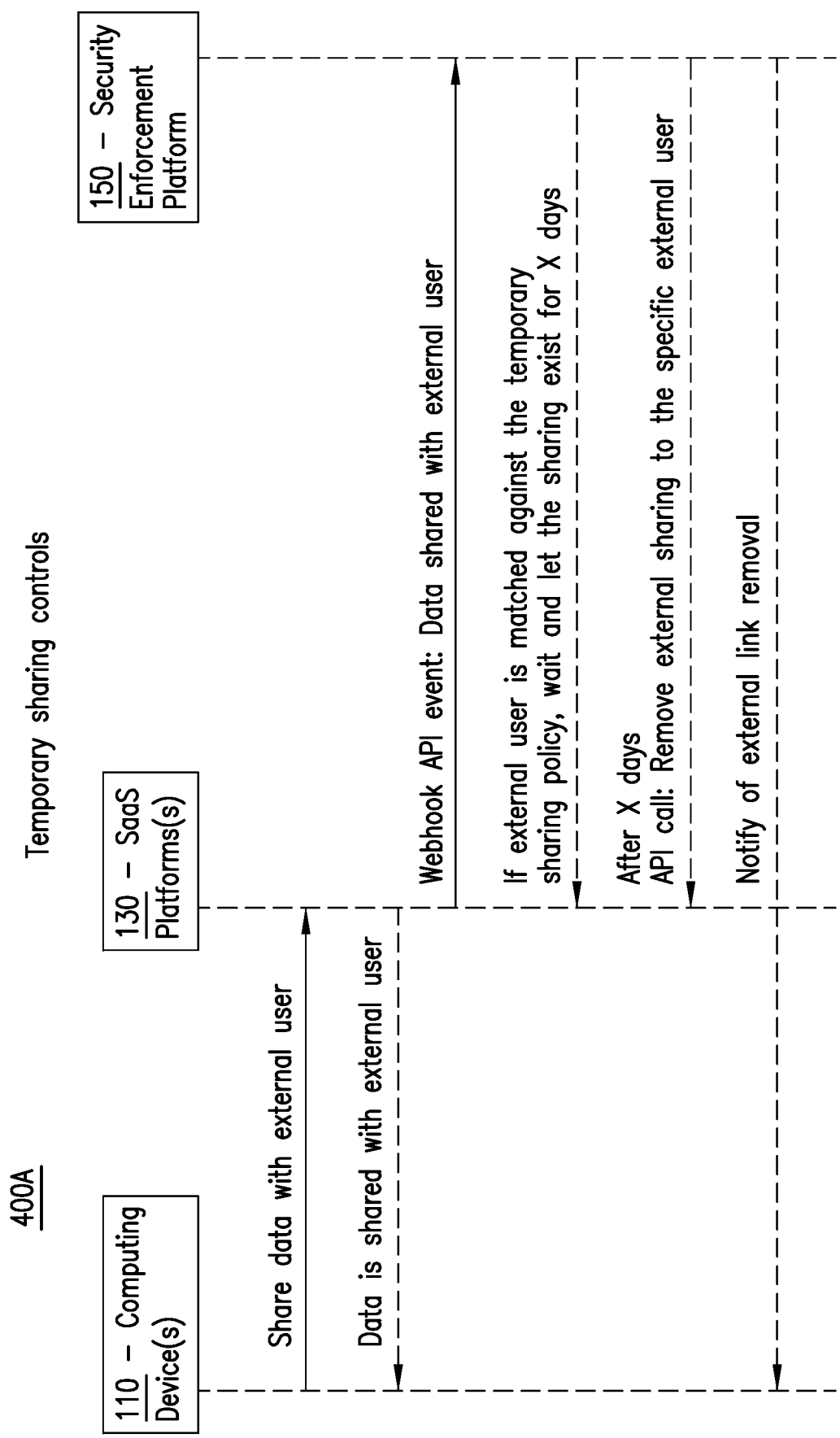
FIG. 4A is a diagram illustrating an exemplary process flow for implementing a temporary sharing control policy in accordance with certain embodiments.
Figure 4B:
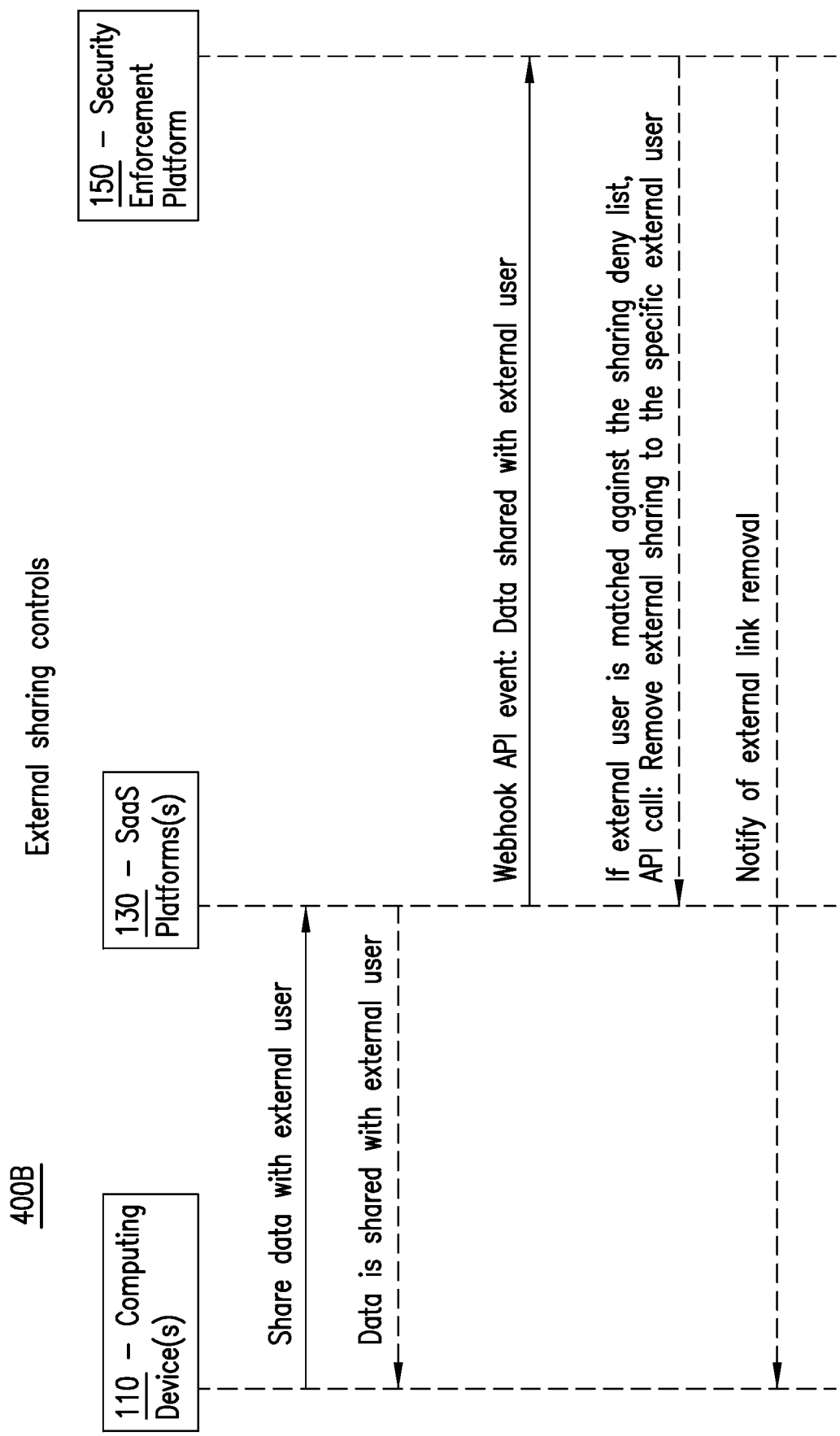
FIG. 4B is a diagram illustrating an exemplary process flow for implementing an external sharing control policy in accordance with certain embodiments.
Figure 4C:
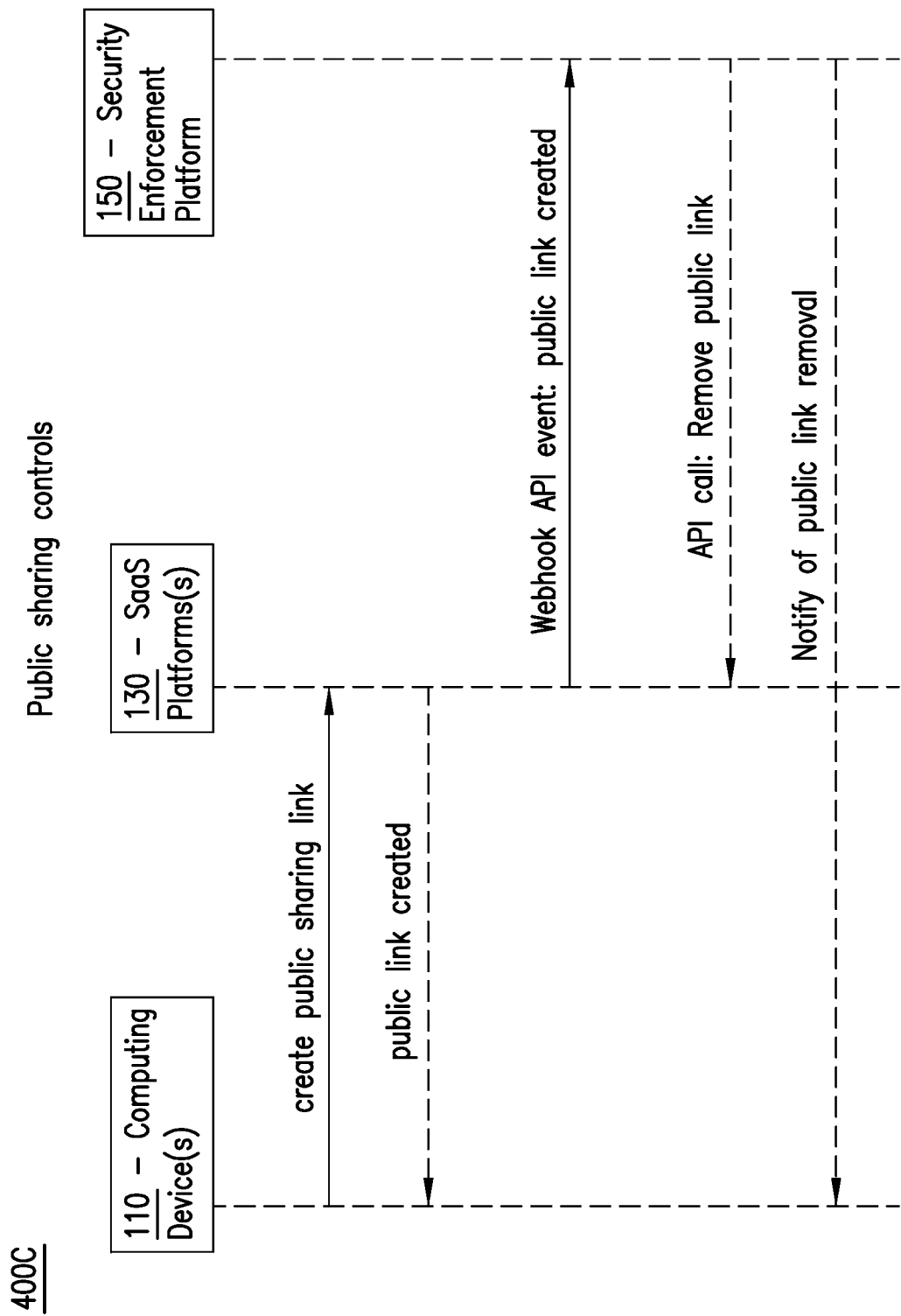
FIG. 4C is a diagram illustrating an exemplary process flow for implementing a public sharing control policy in accordance with certain embodiments.

FIG. 4A-4C are diagrams illustrating exemplary process flows for implementing control policies 180 in accordance with certain embodiments. These diagrams illustrate communications between computing devices 110 operated by a user, a security enforcement platform 150, and one or more SaaS platforms 130.

FIG. 4A is a diagram that illustrates an exemplary process flow 400A for implementing a temporary sharing control policy in accordance with certain embodiments. This process flow 400A may be implemented after a temporary sharing control policy has been defined on the security enforcement platform 150 (e.g., using interface 300B in FIG. 3B). As demonstrated below, the temporary sharing control policy may be utilized to set an expiration date and/or time on which access to a shared file 140 will expire (and after which access to the shared filed 140 is prohibited).

A user submits a request (e.g., using a computing device 110) to a SaaS platform 130 to share a file 140 with another user (e.g., an external user). The request may be sent from a SaaS account 146 that is integrated with, or linked to, the security enforcement platform 150. In response to receiving the request, the SaaS platform 130 shares the file 140 with the recipient user. A web hook associated with the SaaS platform 130 automatically forwards the activity event 141 corresponding to the share operation to the security enforcement platform 150 via an API 145. The security enforcement platform 150 analyzes the metadata associated with the activity event 141 to determine if the temporary sharing control policy established on the security enforcement platform 150 applies to the activity event 141. This may involve comparing or matching the metadata associated with the activity event 141 to the filtering criteria associated with the temporary sharing control policy (e.g., to determine if the user and the SaaS account 146 which is sharing the file 140 matches the filtering criteria specified by the workflow conditions section 310).

If the metadata matches the filtering criteria, the security enforcement platform 150 automatically transmits a command to the SaaS platform 130 via the API 145 to remove sharing privileges for the recipient user after a predetermined time period. The time period may be specified in the workflow actions 320 section when the temporary sharing control policy was established. After access to the file 140 is removed, one or more notifications indicating that file sharing privileges have been removed or revoked may be transmitted to the user that shared the file 140 and/or the recipient of the shared file 140.

FIG. 4B is a diagram illustrating an exemplary process flow 400B for implementing a deny list control policy in accordance with certain embodiments. This process flow 400B may be implemented after a deny list control policy has been defined on the security enforcement platform 150 (e.g., using interface 300C in FIG. 3C). The deny list control policy can be used to prohibit files from being shared with specific users and/or specific SaaS accounts 146 (e.g., in some cases, specific users and/or SaaS accounts that are external to an organization).

A user submits a request (e.g., using a computing device 110) to a SaaS platform 130 to share a file 140 with another user (e.g., an external user). The request may be sent from a SaaS account 146 that is integrated with, or linked to, the security enforcement platform 150. In response to the request, the SaaS platform 130 shares the file 140 with the recipient user. A web hook associated with the SaaS platform 130 automatically forwards the activity event 141 corresponding to the share operation to the security enforcement platform 150 via an API 145. The security enforcement platform 150 analyzes the metadata associated with the activity event 141 to determine if the deny list control policy established on the security enforcement platform 150 applies to the activity event 141. This may involve comparing or matching the metadata associated with the activity event 141 to the filtering criteria associated with the temporary sharing control policy (e.g., to determine if the recipient user has been identified as an unauthorized user pursuant to the deny list control policy).

If the metadata matches the filtering criteria, the security enforcement platform 150 automatically transmits a command to the SaaS platform 130 via the API 145 to remove sharing privileges for the recipient user, thus preventing the file 140 from being shared with the recipient user. After access to the file 140 is removed, one or more notifications indicating that file sharing privileges have been removed or revoked may be transmitted to the user that shared the file 140 and/or the recipient user that was denied access to the file 140.

FIG. 4C is a diagram illustrating an exemplary process flow 400C for implementing a public sharing control policy in accordance with certain embodiments. This process flow 400C may be implemented after a public sharing control policy has been defined on the security enforcement platform 150 (e.g., using interface 300C in FIG. 3C). The public sharing control policy can be used to prohibit files 140 from being shared publicly.

A user submits a request (e.g., using a computing device 110) to a SaaS platform 130 to share a file 140 (e.g., with another user). The sharing privileges associated with the file may permit the file to be shared publicly. The request may be sent from a SaaS account 146 that is integrated with, or linked to, the security enforcement platform 150. In response to the request, the SaaS platform 130 shares file 140 with the public permissions. A web hook associated with the SaaS platform 130 automatically forwards the activity event 141 corresponding to the share operation to the security enforcement platform 150 via an API 145. The security enforcement platform 150 analyzes the metadata associated with the activity event 141 to determine if the public sharing control policy established on the security enforcement platform 150 applies to the activity event 141. This may involve comparing or matching the metadata associated with the activity event 141 to the filtering criteria associated with the temporary sharing control policy (e.g., to determine if the user and/or SaaS account 146 is permitted to share files 140 publicly).

If the metadata matches the filtering criteria (thus, indicating that the user or SaaS account 146 is not permitted to publicly share files 140), the security enforcement platform 150 automatically transmits a command to the SaaS platform 130 via the API 145 to remove public sharing privileges. In some cases, this may involve removing all access privileges and/or preventing the file 140 from being shared in any manner. In other cases, this may involve removing public privileges associated with the file 140, but permitting shared access to the file 140 by designated recipients of the share request. After public access to the file 140 is removed, one or more notifications indicating that public sharing privileges have been removed may be transmitted to the user that shared the file 140 and/or other users.

Figure 2:
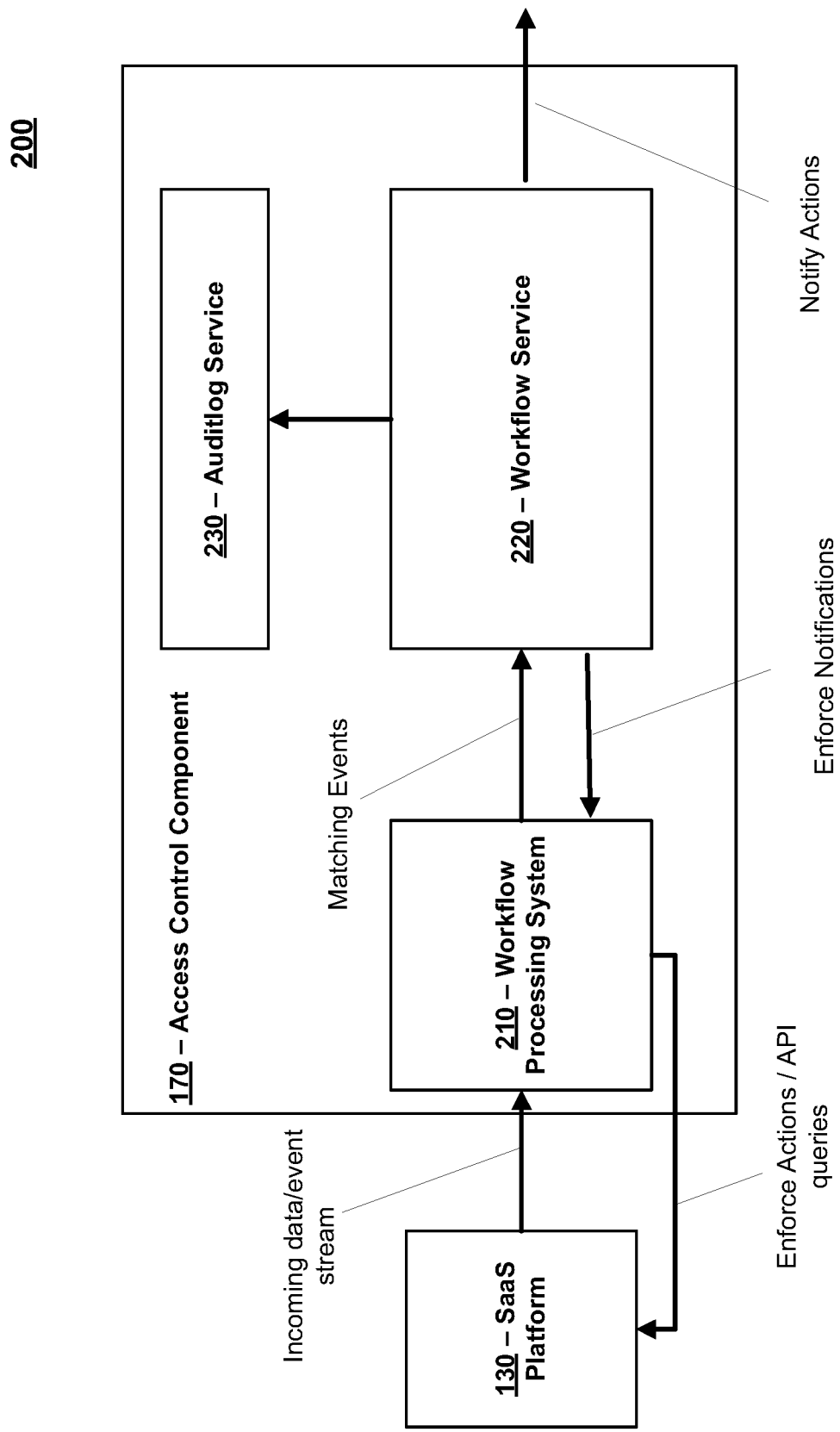
FIG. 2 is a block diagram of an exemplary security enforcement platform in accordance with certain embodiments.

FIG. 2 discloses an exemplary architecture 200 for a security enforcement platform 150 according to certain embodiments. In certain embodiments, the exemplary architecture 200 may be utilized to implement the access control component 170 and/or other portions of the security enforcement platform 150. The architecture includes a workflow processing system 210, a workflow service 220, and an audit log service 230.

The workflow processing system 210 can store access control policies 180 defined by users. The workflow processing system 210 also can be configured to receive, process, and analyze activity events 141 generated by SaaS platforms 130 that are linked to the security enforcement platform 150. The workflow processing system 210 may analyze activity events 141 to determine if one or more control policies 180 apply to each of sharing operations conducted on the linked SaaS accounts 146. If the metadata associated with the activity events 141 does not include sufficient information, an event normalization component 172 (FIG. 1B) provided by the workflow processing system 210 may transmit queries to APIs 145 associated with the SaaS platforms 130 to retrieve the missing information.

The workflow service 220 can execute one or more actions to enforce the control policies 180. The one or more actions may be executed in response to detecting that an activity event 141 matches the filtering criteria associated with a control policy 180. The workflow service 220 may execute any of the actions mentioned in this disclosure including, but not limited to, the enforce actions, approve actions, notify actions, and/or wait actions.

The audit log service 230 records and stores data indicating all actions that are executed by the security enforcement platform 150. For example, the audit log service 230 can store any or all data associated with activity events 141 that have been received by the security enforcement platform 150, actions that have been executed by the security enforcement platform 150, and/or control policies 180 that have been enforced by the security enforcement platform 150.

In certain embodiments, the audit log service 230 and/or other component of the security enforcement platform 150 may provide one or more interfaces that permit users to analyze and investigate security activities executed by the security enforcement platform 150. The security enforcement platform 150 can generally display any data information relating to activity events 141 that are received and/or control policy enforcement activities.

FIG. 5 is an exemplary interface 500 that may be provided by a security enforcement platform 150 in accordance with certain embodiments. The interface 500 provides a summary of various security activities executed by the security enforcement platform 150, and permits a user to analyze details relating to the various security activities.

In certain embodiments, for each activity executed by the security enforcement platform 150, a data entry may be generated and displayed on an interface which indicates various information associated with the activity including:

Date—data indicating the date and time of incoming activity event 141;

Actor—data indicating the user who initiated the activity event 141 (e.g., the user who is attempting to share a file 140, initiate a file event 143, and/or conduct a user event 144);

Target—data indicating the recipient user associated with the activity event (e.g., data identifying one or more intended recipients of a shared file or data indicating that a file 140 was shared publicly);

App—data indicating the SaaS platform 130 that originated the activity event 141 (e.g., data identifying the SaaS platform 130 that is sharing a file 140 or attempting to share a file 140, changing user account settings, and/or manipulating files/directories);

Asset—data indicating the file that is attempting to be shared;

Event type—data indicating the type of access (download, share, edit, etc.) associated with the activity event 141; and Event ID—a unique identifier that is associated with the security activity executed by the security enforcement platform 150;

Event JSON—data indicating the raw or original structure of incoming activity event 141 (e.g., the actual activity event 141 generated by a SaaS platform 130 before metadata is supplemented by the event normalization component and/or other component of the security enforcement platform 150).

The interface can include various options for filtering the data entry displayed on an interface (e.g., GUI). For example, the user may select options for only viewing data entries corresponding to particular control policies 180, particular users, and/or particular files that were involved with the security activities executed by the security enforcement platform 150.

In certain embodiments, the audit log service 230 and/or other component of the security enforcement platform 150 (e.g., such as the security verification component 175), can generate one or more interfaces (e.g., GUIs) that summarize activities pertaining to security verification requests 171 and/or the security verification component. For example, in some embodiments, these interfaces can provide charts, graphs, lists, and/or other data indicating any or all of the following: 1) all users that were sent security verification requests; 2) for each security verification request sent to a user, whether the user has approved each of the share events identified in the security verification request; 3) for each security verification request sent to a user, whether the user has denied each of the share events identified in the security verification request; and/or 4) for each security verification request sent to a user, all information, parameters, and/or data associated with each of the share events identified in the security verification request (e.g., identifying recipients, files shared, times and dates or sharing, sharing privileges, etc.). The one or more interfaces can provide other data or information related to the security verification requests as well.

The one or more interfaces (e.g., GUIs) summarizing activities pertaining to security verification requests 171 and/or activity events also can be accessible to security personnel, administrators, and/or other individuals associated with the security enforcement platform 150. The one or more interfaces (e.g., GUIs) also can include options that permit these individuals to execute various functions in connection with the security verification requests 171 and/or activity events associated with the security verification requests. For example, the one or more interfaces can include options that enable some or all of the following functions to be executed: 1) approving, cancelling, and/or modifying a share event; 2) approving, cancelling, and/or modifying access to files 140 that are the subject of share events; 3) approving, cancelling, and/or modifying access privileges associated with the share events; 4) flagging share events and/or security verification requests 171 for further review; 5) communicating with users who initiated the share events and/or who received the security verification requests 171; 6) approving, cancelling, and/or modifying file events 143; and/or 7) approving, cancelling, and/or modifying user events 144. The one or more interfaces can permit users to execute other related functions as well.

In certain embodiments, the security enforcement platform 150 also may include an API that enables the data and functions associated with the security enforcement platform 150 to be accessed by, or integrated with, third-party software solutions. For example, the API may permit external software applications and/or external SaaS platforms to access and utilize the data, functions, and features provided by the security enforcement platform 150.

In one example, a third party software solution can access activity events 141 received by the security enforcement platform 150 via the API. The third party software solution can then process the activity events 141 and/or analyze the activity events 141 for various purposes (e.g., to implement custom controls on file sharing, plugin usage, etc.). After processing the activity events 141, the third party software solution can then transmit commands to the security enforcement platform 150 via the API to execute one or more actions and functions. For example, the commands may instruct the security enforcement platform 150 to revoke, cancel, modify, and/or approve activity events (e.g., share events 142, file events 143, and/or user events 144) based on analysis of the activity events by the third party software solution. Similarly, the commands may instruct the security enforcement platform 150 to approve or deny plugin installation.

In this manner, the API associated with the security enforcement platform 150 permits the third party software solutions to take advantage of, and utilize, the security enforcement platform as centralized controller for controlling security across multiple SaaS platforms 130.

Figure 7:
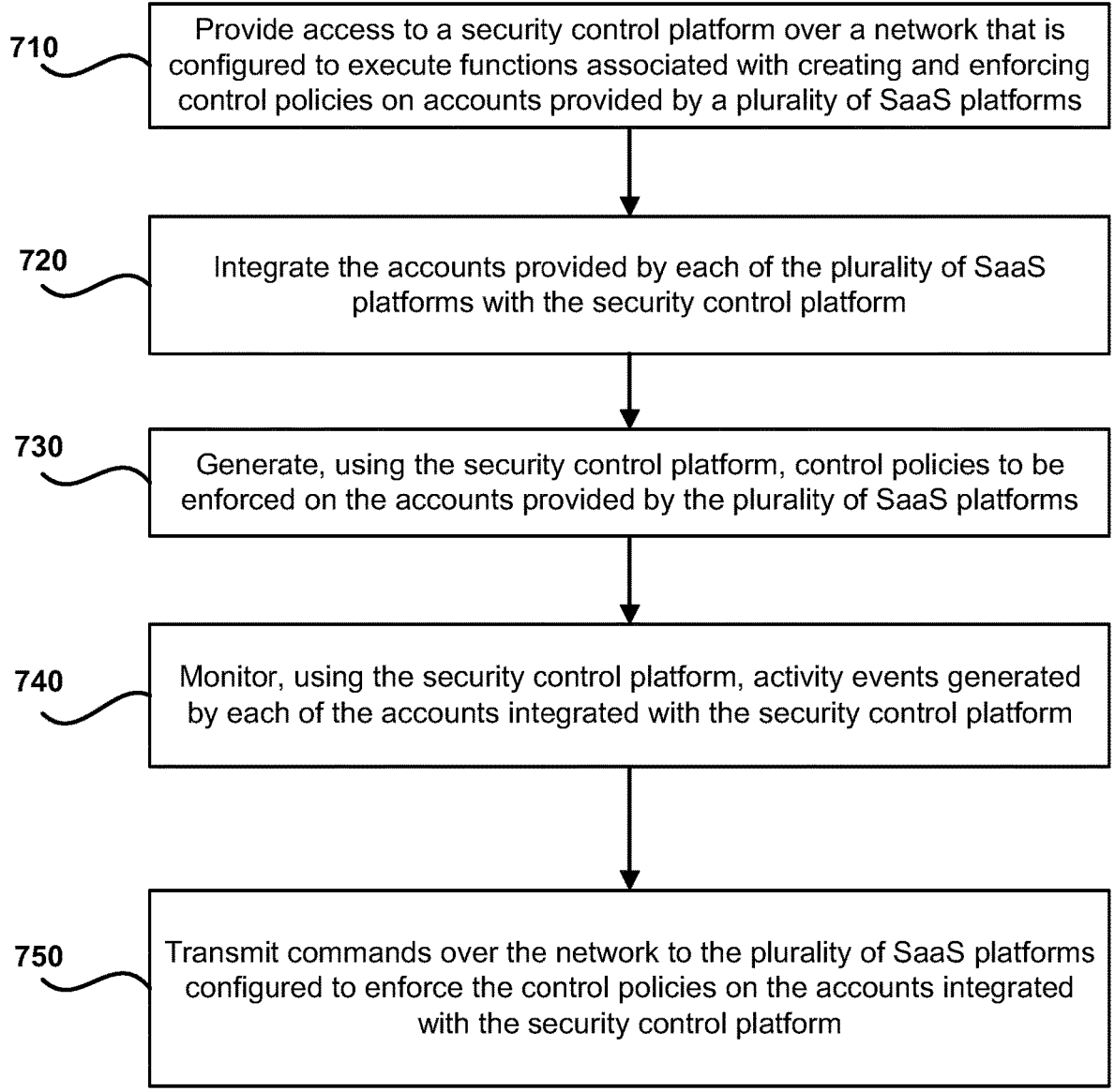
FIG. 7 is exemplary method according to certain embodiments.

FIG. 7 is a flow diagram illustrating an exemplary method 700 according to certain embodiments. In certain embodiments, the security control platform 150, access control component 170, and/or one or more servers 120 can include one or more storage modules that store instructions for implementing the functions described in the method 700. In some embodiments, the functions of the method 700 can be performed in the order presented. In other embodiments, the functions of method 700 can be performed in any suitable order. In still other embodiments, one or more of the functions of method 700 can be combined or skipped.

At step 710, access is provided to a security control platform over a network. The security control platform can be configured to execute functions associated with creating and enforcing control policies on accounts provided by a plurality of SaaS platforms.

At step 720, the accounts provided by each of the plurality of SaaS platforms are integrated with the security control platform.

At step 730, control policies are generated by the security control platform. The control policies are intended to be enforced on the accounts provided by the plurality of SaaS platforms.

At step 740, the security control platform monitors activity events generated by each of the accounts integrated with the security control platform.

At step 750, the security control platform transmits commands over the network to the plurality of SaaS platforms. The commands are configured to enforce the control policies on the accounts integrated with the security control platform and at least a portion of the commands can be transmitted in response to the activity events monitored by the security control platform.

As evidenced by this disclosure, the security techniques disclosed herein provide various advantages to users and organizations. One advantage is that the techniques described herein provide increased security in connection with utilizing SaaS accounts and sharing files and, in some cases, can be applied to prevent data breaches and/or unauthorized accessing of files. Moreover, these techniques can permit organizations to securely utilize various SaaS applications without impeding user experiences. Another advantage is that a single, centralized security enforcement platform can be used to enforce control policies on SaaS accounts and files across varying SaaS platforms and/or other software solutions. This centralized platform can increase operational efficiencies and avoid manual review of various SaaS accounts. Another advantage is that the control policies can be defined and customized granularly on each on the SaaS platforms and/or other software solutions. Another advantage is that the security verification techniques enable users to easily confirm and/or deny whether share events and/or activity events occurring on the SaaS platforms were validly authorized. Many other advantages would be apparent to one of skilled in the art.

In some embodiments, a system is provided for enforcing control policies across software as a service (SaaS) platforms. The system comprises one or more server devices accessible over a network, and the one or more server devices are configured to: provide access to a security control platform over a network, the security control platform being configured to execute functions associated with creating and enforcing control policies on accounts provided by a plurality of SaaS platforms; integrate the accounts provided by each of the plurality of SaaS platforms with the security control platform; generate, using the security control platform, control policies to be enforced on the accounts provided by the security control platform; monitor, using the security control platform, activity events generated by each of the accounts integrated with the security control platform; and transmit, using the security control platform, commands over the network to the plurality of SaaS platforms, wherein the commands are configured to enforce the control policies on the accounts integrated with the security control platform and at least a portion of the commands are transmitted in response to the activity events monitored by the security control platform.

In some embodiments, a method is provided for enforcing control policies on software as a service (SaaS) platforms. The method can be being implemented via execution of computing instructions configured to run at one or more processors and configured to be stored on at least one non-transitory storage device. The method comprises: providing access to a security control platform over a network, the security control platform being configured to execute functions associated with creating and enforcing control policies on accounts provided by a plurality of SaaS platforms; integrating the accounts provided by each of the plurality of SaaS platforms with the security control platform; generating, using the security control platform, control policies to be enforced on the accounts provided by the security control platform; monitoring, using the security control platform, activity events generated by each of the accounts integrated with the security control platform; and transmitting, using the security control platform, commands over the network to the plurality of SaaS platforms, wherein the commands are configured to enforce the control policies on the accounts integrated with the security control platform and at least a portion of the commands are transmitted in response to the activity events monitored by the security control platform.

In some embodiments, a computer program product is provided for enforcing control policies on software as a service (SaaS) platforms. The computer program product comprises a non-transitory computer-readable medium that stores instructions for causing one or more computer devices to: provide access to a security control platform over a network, the security control platform being configured to execute functions associated with creating and enforcing control policies on accounts provided by a plurality of SaaS platforms; integrate the accounts provided by each of the plurality of SaaS platforms with the security control platform; generate, using the security control platform, control policies to be enforced on the accounts provided by the security control platform; monitor, using the security control platform, activity events generated by each of the accounts integrated with the security control platform; and transmit, using the security control platform, commands over the network to the plurality of SaaS platforms, wherein the commands are configured to enforce the control policies on the accounts integrated with the security control platform and at least a portion of the commands are transmitted in response to the activity events monitored by the security control platform.

* * * * *

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A system for enforcing control policies across software as a service (SaaS) platforms, the system comprising:
   one or more server devices accessible over a network, the one or more server devices being configured to:
   provide access to a security control platform over the network, the security control platform being configured to execute functions associated with creating and enforcing control policies on accounts provided by a plurality of SaaS platforms;
   integrate the accounts provided by each of the plurality of SaaS platforms with the security control platform;
   generate, using the security control platform, control policies to be enforced on the accounts provided by the plurality of SaaS platforms, wherein the security control platform provides interfaces that enable users to define the control policies, and the interfaces enable the following control policies to be defined:
      a first control policy configured to control expirations of files that are shared using one or more of the accounts provided by the plurality of SaaS platforms;
      a second control policy configured to prohibit files from being shared with one or more specified users using one or more of the accounts provided by the plurality of SaaS platforms;
      a third control policy configured to control sharing of files with public privileges using one or more of the accounts provided by the plurality of SaaS platforms;
      a fourth control policy configured to control sharing of inactive files using one or more of the accounts provided by the plurality of SaaS platforms;
      a fifth control policy configured to control sharing of files with users or accounts that do not utilize multi-factor authentication using one or more of the accounts provided by the plurality of SaaS platforms; and
      a sixth control policy configured to implement data retention rules on files associated with one or more of the accounts provided by the plurality of SaaS platforms;
   monitor, using the security control platform, activity events generated by each of the accounts integrated with the security control platform; and
   transmit, using the security control platform, commands over the network to the plurality of SaaS platforms, wherein the commands are configured to enforce the control policies on the accounts integrated with the security control platform and at least a portion of the commands are transmitted in response to the activity events monitored by the security control platform.

2. The system of claim 1, wherein:
the security control platform centralizes enforcement of the control policies on the accounts provided by the plurality of SaaS platforms; and
the security control platform is external to each of plurality of SaaS platforms and remotely enforces the control policies over the network.

3. The system of claim 1, wherein one or more of the control policies include file sharing control policies that are configured to control or manage sharing of files by the accounts provided by the plurality of SaaS platforms.

4. The system of claim 1, wherein:
the activity events include metadata describing activities of the accounts provided by the SaaS platforms;
the metadata included in the activity events varies across the plurality of SaaS platforms; and
the security control platform executes an event normalization function that normalizes the metadata associated with the activity events generated by the plurality of SaaS platforms.

5. The system of claim 4, wherein:
in response to determining that an activity event generated by a SaaS platform does not include sufficient information to assess whether one or more of the control policies apply, the event normalization function retrieves or requests additional information from the SaaS platform pertaining to the activity event.

6. The system of claim 1, wherein:
the security control platform is configured to transmit a security verification request to one or more users in response to detecting a share event included in the activity events; and
the security verification request includes options that enable the one or more users to approve or deny sharing of the one or more files.

7. The system of claim 6, wherein the security verification request is transmitted to a user that initiated the share event to enable self-verification of the share event.

8. The system of claim 1, wherein the security control platform is configured to generate and enforce one or more control policies pertaining to file events.

9. The system of claim 1, wherein the security control platform is configured to generate and enforce one or more control policies pertaining to user events.

10. A method for enforcing control policies on software as a service (SaaS) platforms, the method being implemented via execution of computing instructions configured to run at one or more processors and configured to be stored on at least one non-transitory storage device, the method comprising:
providing access to a security control platform over the network, the security control platform being configured to execute functions associated with creating and enforcing control policies on accounts provided by a plurality of SaaS platforms;
integrating the accounts provided by each of the plurality of SaaS platforms with the security control platform;
generating, using the security control platform, control policies to be enforced on the accounts provided by the plurality of SaaS platforms;
providing, by the security control platform, interfaces that enable users to define the control policies, wherein the interfaces enable the following control policies to be defined:
a first control policy configured to control expirations of files that are shared using one or more of the accounts provided by the plurality of SaaS platforms;
a second control policy configured to prohibit files from being shared with one or more specified users using one or more of the accounts provided by the plurality of SaaS platforms;
a third control policy configured to control sharing of files with public privileges using one or more of the accounts provided by the plurality of SaaS platforms;
a fourth control policy configured to control sharing of inactive files using one or more of the accounts provided by the plurality of SaaS platforms;
a fifth control policy configured to control sharing of files with users or accounts that do not utilize multi-factor authentication using one or more of the accounts provided by the plurality of SaaS platforms; and
a sixth control policy configured to implement data retention rules on files associated with one or more of the accounts provided by the plurality of SaaS platforms;
monitoring, using the security control platform, activity events generated by each of the accounts integrated with the security control platform; and
transmitting, using the security control platform, commands over the network to the plurality of SaaS platforms, wherein the commands are configured to enforce the control policies on the accounts integrated with the security control platform and at least a portion of the commands are transmitted in response to the activity events monitored by the security control platform.

11. The method of claim 10, wherein:
the security control platform centralizes enforcement of the control policies on the accounts provided by the plurality of SaaS platforms; and
the security control platform is external to each of plurality of SaaS platforms and remotely enforces the control policies over the network.

12. The method of claim 10, wherein one or more of the control policies include file sharing control policies that are configured to control or manage sharing of files by the accounts provided by the plurality of SaaS platforms.

13. The method of claim 10, wherein:
the activity events include metadata describing activities of the accounts provided by the SaaS platforms;
the metadata included in the activity events varies across the plurality of SaaS platforms; and
the security control platform executes an event normalization function that normalizes the metadata associated with the activity events generated by the plurality of SaaS platforms.

14. The method of claim 13, wherein:
in response to determining that an activity event generated by a SaaS platform does not include sufficient information to assess whether one or more of the control policies apply, the event normalization function retrieves or requests additional information from the SaaS platform pertaining to the activity event.

15. The method of claim 10, wherein:
the security control platform is configured to transmit a security verification request to one or more users in response to detecting a share event included in the activity events;
the security verification request includes options that enable the one or more users to approve or deny sharing of the one or more files; and
the security verification request is at least transmitted to a user that initiated the share event to enable self-verification of the share event.

16. A computer program product for enforcing control policies on software as a service (SaaS) platforms, the computer program product comprising a non-transitory computer-readable medium including instructions for causing one or more computer devices to:
provide access to a security control platform over a network, the security control platform being configured to execute functions associated with creating and enforcing control policies on accounts provided by a plurality of SaaS platforms;
integrate the accounts provided by each of the plurality of SaaS platforms with the security control platform;
generate, using the security control platform, control policies to be enforced on the accounts provided by the plurality of SaaS platforms, wherein the security control platform provides interfaces that enable users to define the control policies, and the interfaces enable the following control policies to be defined:
a first control policy configured to control expirations of files that are shared using one or more of the accounts provided by the plurality of SaaS platforms;
a second control policy configured to prohibit files from being shared with one or more specified users using one or more of the accounts provided by the plurality of SaaS platforms;

a third control policy configured to control sharing of files with public privileges using one or more of the accounts provided by the plurality of SaaS platforms;

a fourth control policy configured to control sharing of inactive files using one or more of the accounts provided by the plurality of SaaS platforms;

a fifth control policy configured to control sharing of files with users or accounts that do not utilize multi-factor authentication using one or more of the accounts provided by the plurality of SaaS platforms; and a sixth control policy configured to implement data retention rules on files associated with one or more of the accounts provided by the plurality of SaaS platforms;

monitor, using the security control platform, activity events generated by each of the accounts integrated with the security control platform; and transmit, using the security control platform, commands over the network to the plurality of SaaS platforms, wherein the commands are configured to enforce the control policies on the accounts integrated with the security control platform and at least a portion of the commands are transmitted in response to the activity events monitored by the security control platform.

17. The computer program product of claim 16, wherein:

the security control platform centralizes enforcement of the control policies on the accounts provided by the plurality of SaaS platforms; and the security control platform is external to each of plurality of SaaS platforms and remotely enforces the control policies over the network.

18. The computer program product of claim 16, wherein one or more of the control policies include file sharing control policies that are configured to control or manage sharing of files by the accounts provided by the plurality of SaaS platforms.

* * * * *